United States Patent
Zhang et al.

(10) Patent No.: US 11,855,822 B2
(45) Date of Patent: Dec. 26, 2023

(54) TECHNIQUES TO FACILITATE TIME VARYING REFERENCE SIGNALS WITH SINGLE CARRIER WAVEFORMS

(71) Applicant: QUALCOMM Incorporated, San Diego, CA (US)

(72) Inventors: Xiaoxia Zhang, San Diego, CA (US); Jun Ma, San Diego, CA (US); Morteza Soltani, San Diego, CA (US); Iyab Issam Sakhnini, San Diego, CA (US); Jing Sun, San Diego, CA (US); Tao Luo, San Diego, CA (US); Hemant Saggar, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 17/305,292

(22) Filed: Jul. 2, 2021

(65) Prior Publication Data

US 2023/0006873 A1 Jan. 5, 2023

(51) Int. Cl.
*H04L 27/26* (2006.01)
*H04L 5/00* (2006.01)
*H04W 80/02* (2009.01)

(52) U.S. Cl.
CPC ........ *H04L 27/2613* (2013.01); *H04L 5/0051* (2013.01); *H04L 27/2607* (2013.01); *H04W 80/02* (2013.01)

(58) Field of Classification Search
CPC ............. H04L 27/2602; H04L 27/2607; H04L 27/2613; H04L 27/26526; H04L 5/0048; H04L 5/0051; H04L 5/0064; H04W 80/02
See application file for complete search history.

(56) References Cited

U.S. PATENT DOCUMENTS

| | | | |
|---|---|---|---|
| 2018/0054282 A1* | 2/2018 | Wang | H04L 5/0007 |
| 2018/0131485 A1* | 5/2018 | Wang | H04B 7/0632 |

FOREIGN PATENT DOCUMENTS

| | | | | |
|---|---|---|---|---|
| CN | 111800794 A | * | 10/2020 | |
| WO | WO-2018201986 A1 | * | 11/2018 | H04J 11/00 |

\* cited by examiner

*Primary Examiner* — Melvin C Marcelo
*Assistant Examiner* — Natali Pascual Peguero
(74) *Attorney, Agent, or Firm* — Procopio, Cory, Hargreaves & Savitch LLP

(57) ABSTRACT

Apparatus, methods, and computer-readable media for facilitating multiplexing of time-varying DMRS within a symbol are disclosed herein. An example method for wireless communication at a receiving device includes receiving a first symbol of a single carrier waveform, the first symbol including a first set of DMRS resources. The example method also includes receiving a second symbol of the single carrier waveform, the second symbol including a second set of DMRS resources, the second set of DMRS resources associated with at least one of a DMRS starting location and a DMRS duration that is different than the first set of DMRS resources.

32 Claims, 15 Drawing Sheets

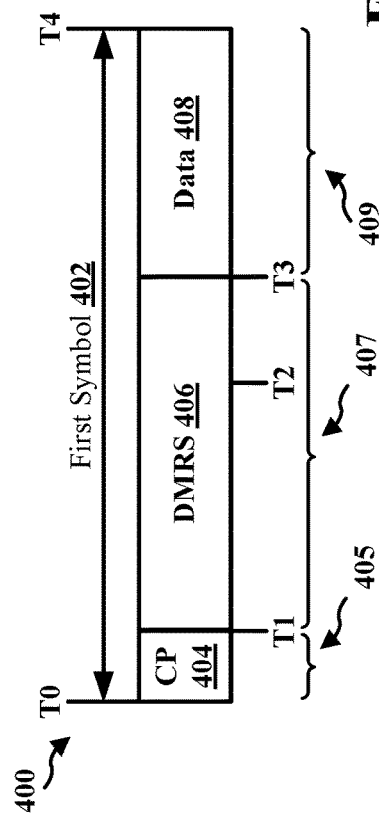
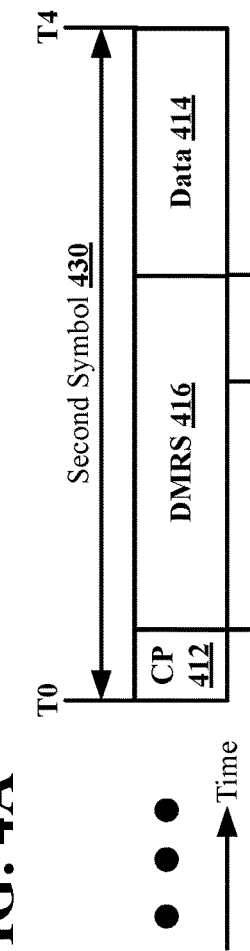
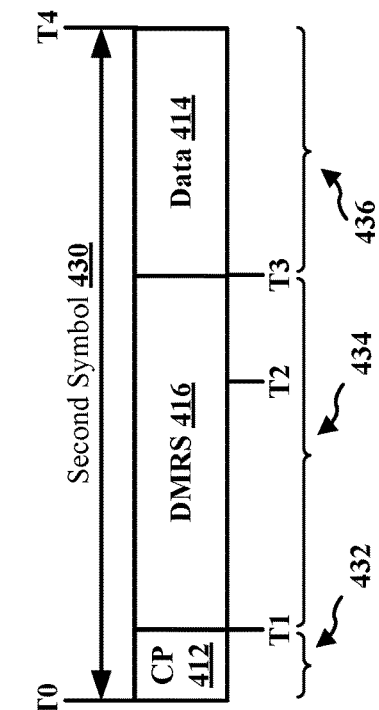
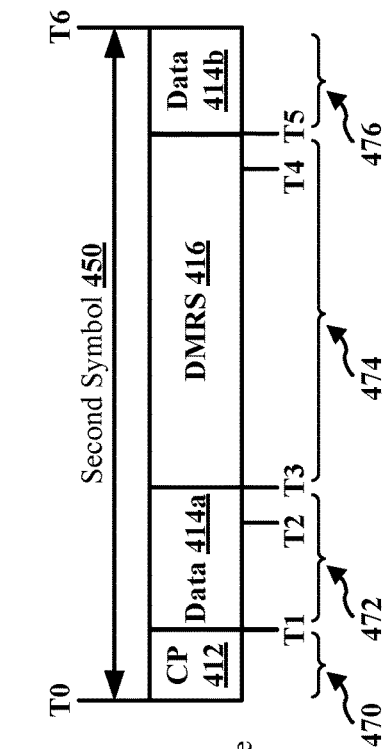
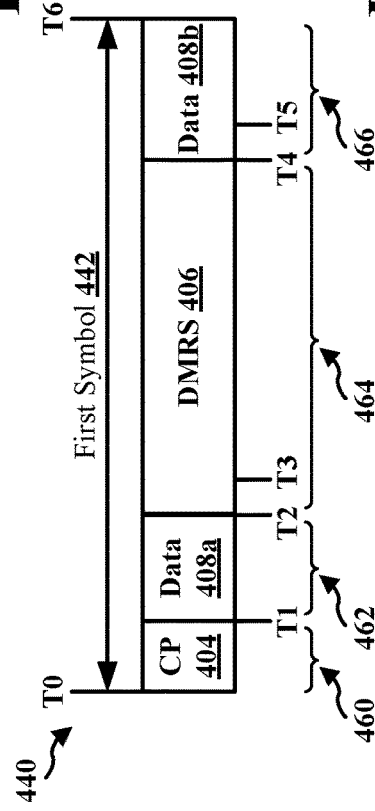
FIG. 4A  FIG. 4B  FIG. 4C

TECHNIQUES TO FACILITATE TIME VARYING REFERENCE SIGNALS WITH SINGLE CARRIER WAVEFORMS

TECHNICAL FIELD

The present disclosure relates generally to communication systems, and more particularly, wireless communication utilizing single carrier (SC) waveforms.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. An example apparatus may receive a first symbol of a single carrier waveform, the first symbol including a first set of demodulation reference signal (DMRS) resources. The example apparatus may also receive a second symbol of the single carrier waveform, the second symbol including a second set of DMRS resources, the second set of DMRS resources associated with at least one of a DMRS starting location and a DMRS duration that is different than the first set of DMRS resources.

In another aspect of the disclosure, a method, a computer-readable medium, and an apparatus are provided for wireless communication of a base station. An example apparatus may transmit a first symbol in a single carrier waveform, the first symbol including a first set of DMRS resources. The example apparatus may also transmit a second symbol in the single carrier waveform, the second symbol including a second set of DMRS resources, the second set of DMRS resources associated with at least one of a DMRS starting location and a DMRS duration that is different than the first set of DMRS resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A illustrates an example of intra-symbol multiplexing of DMRS and data utilizing time-varying DMRS locations, in accordance with various aspects of the present disclosure.

FIG. 4B illustrates another example of intra-symbol multiplexing of DMRS and data utilizing time-varying DMRS locations, in accordance with various aspects of the present disclosure.

FIG. 4C illustrates another example of intra-symbol multiplexing of DMRS and data utilizing time-varying DMRS locations, in accordance with various aspects of the present disclosure.

DETAILED DESCRIPTION

Figure 1:
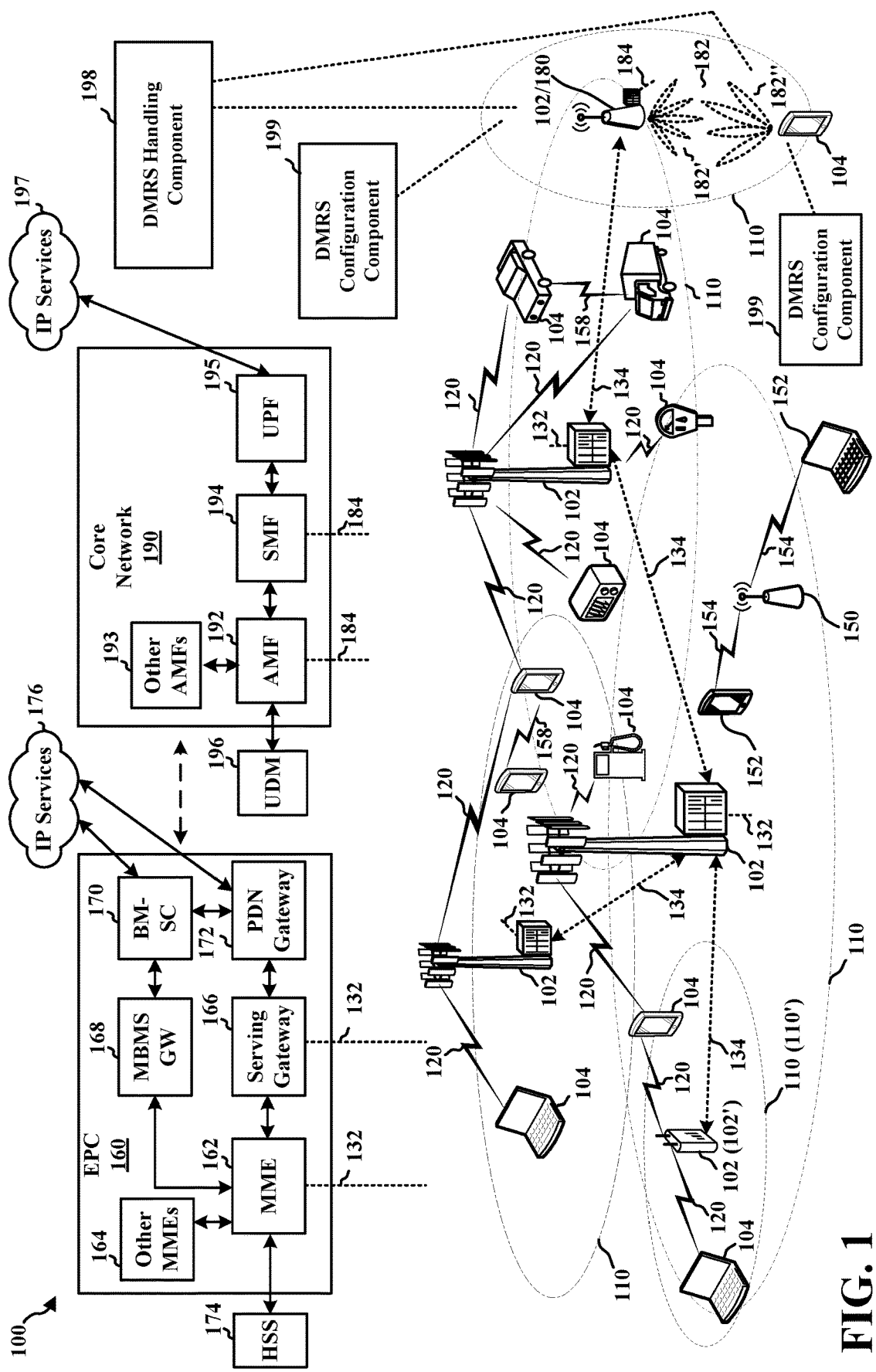
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

In wireless communications, a waveform may refer to the signal that is mixed with information before being radiated across an air-interface. In some examples, the waveform may include a multiple carrier waveform. Multiple carrier waveforms may be implemented via orthogonal frequency division multiplexing (OFDM) modulation.

Another example of a waveform that may be applied to a transmission is a single carrier (SC) waveform. Single carrier waveforms may be used for downlink transmissions and/or uplink transmissions. Compared to multiple carrier waveforms (e.g., OFDM waveforms), SC waveforms may be associated with a relatively lower Peak to Average Power Ratio (PAPR). A lower PAPR associated with a transmission may provide better power efficiency, which may improve link budget and provide better coverage. Additionally, SC waveforms may provide increased flexibility in implementation compared to multiple carrier waveforms. When operating in higher frequency bands with wide channel bandwidth, the performing of the FFT operations may not be resource friendly.

In a wireless communication environment, a set of resources may be allocated for UL transmissions and/or DL transmissions between a UE and a base station. For some deployment environments of the UE, the allocated resources may result in interference at the UE. The UE may use demodulation reference signals (DMRSs) to measure channel conditions and to help demodulate the channel. For example, the UE may use DMRS for a DL control channel to estimate the propagation channel experienced by the DL control channel. The UE may use the resultant information to help demodulate the DL control channel (e.g., use the measured channel conditions to perform equalization on the DL control channel) and to subsequently decode downlink control information. The configuration (or placement) of the DMRS may be semi-static (e.g., based on RRC signaling) and enable the UE to perform channel estimations.

In some examples, intra-symbol multiplexing of reference signals and a channel may be performed when using SC waveforms. For example, DMRS may be multiplexed with a channel in the time-domain of an SC waveform. Intra-symbol multiplexing may be useful, for example, when a data transmission has a limited number of symbols (e.g., PBCH), or when a control channel or a data channel spans a small number of symbols (e.g., with a small number of payloads). In addition, intra-band multiplexing using reference signals may be useful to provide multiple opportunities to receive the reference signal to determine the effects of time-varying channels (e.g., channels for which conditions may change over time), to improve frequency tracking loops (FTL), to improve phase noise compensation, etc. However, using symbol-level multiplexing may result in non-trivial overhead, for example, between a transmitting device and a receiving device.

In some examples, DMRS may be front-loaded within a slot. For example, in a slot that includes 14 symbols, the second symbol or the third symbol may be allocated to DMRS. However, in such examples, the DMRS may be allocated to one symbol, which limits tracking time-varying characteristics on the channel.

Aspects disclosed herein provide techniques for facilitating intra-symbol multiplexing between DMRS and other signals of an SC waveform. For example, disclosed technique utilizes a time-domain DMRS pattern that indicates a starting location and a duration of the DMRS of a symbol. The time-domain DMRS pattern may enable a network to control overhead, for example, with respect to the DMRS. The time-domain DMRS pattern may additionally or alternatively enable the network to apply an applicable configuration based on a target use case. For example, if channel conditions are good, then the network may utilize a time-domain DMRS pattern in which resources allocated to DMRS are reduced compared to scenarios in which channel conditions are poor or less than good. In some examples, the time-domain DMRS pattern may facilitate allocating less than all of the resources of a symbol to DMRS (e.g., the DMRS may be allocated to a portion of the resources of the symbol). In some examples, based on the time-domain DMRS pattern, the DMRS may be repeated across symbols.

In some examples, the time-domain DMRS pattern may facilitate time-varying DMRS locations. For example, different symbols may include different starting points for the respective DMRS. In some examples, the time-domain DMRS pattern may facilitate time-varying DMRS densities. For example, different symbols may include DMRS portions that start at the same location, but are associated with different durations. In some examples, the time-domain DMRS pattern may facilitate multiplexing DMRS and another reference signal in a same symbol. In some examples, it may be beneficial to multiplex the DMRS with another reference signal. For example, the DMRS may be multiplexed with PTRS to improve phase noise compensation (e.g., to reduce the impact of phase noise).

FIG. 1 is a diagram illustrating an example of a wireless communications system and an access network 100 including base stations 102 and 180 and UEs 104. In certain aspects, a receiving device in communication with a transmitting device may be configured to manage one or more aspects of wireless communication by facilitating time-varying reference signals in single carrier waveforms. In some examples, the receiving device may be implemented by a UE, such as the UE 104. In some examples, the receiving device may be implemented by a base station, such as the base stations 102/180. The receiving device may include a DMRS handling component 198 configured to receiving time-varying DMRS in single carrier waveforms. In certain aspects, the DMRS handling component 198 may be configured to receive a first symbol of a single carrier waveform, the first symbol including a first set of DMRS resources. The example DMRS handling component 198 may also be configured to receive a second symbol of the single carrier waveform, the second symbol including a second set of DMRS resources, the second set of DMRS resources associated with at least one of a DMRS starting location and a DMRS duration that is different than the first set of DMRS resources.

In another configuration, a transmitting device in communication with a receiving device may be configured to manage one or more aspects of wireless communication by facilitating time-varying reference signals in single carrier waveforms. In some examples, the transmitting device may be implemented by a base station, such as the base stations 102/180. In some examples, the transmitting device may be implemented by a UE, such as the UE 104. The transmitting device may include a DMRS configuration component 199 configured to transmit time-varying DMRS in single carrier waveforms. In certain aspects, the DMRS configuration component 199 may be configured to transmit a first symbol in a single carrier waveform, the first symbol including a first set of DMRS resources. The example DMRS configuration component 199 may also be configured to transmit a second symbol in the single carrier waveform, the second symbol including a second set of DMRS resources, the second set of DMRS resources associated with at least one of a DMRS starting location and a DMRS duration that is different than the first set of DMRS resources.

The aspects presented herein may enable devices in communication to transmit and receive time-varying DMRS in single carrier waveforms, which may facilitate improving communication performance, for example, by improving throughput, capacity, and/or spectral efficiency.

Although the following description provides examples directed to 5G NR (and, in particular, to single carrier waveforms), the concepts described herein may be applicable to other similar areas, such as LTE, LTE-A, CDMA, GSM, and/or other wireless technologies, in which devices may communicate using single carrier waveforms.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 e.g., X2 interface). The first backhaul links 132, the second backhaul links 184 and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
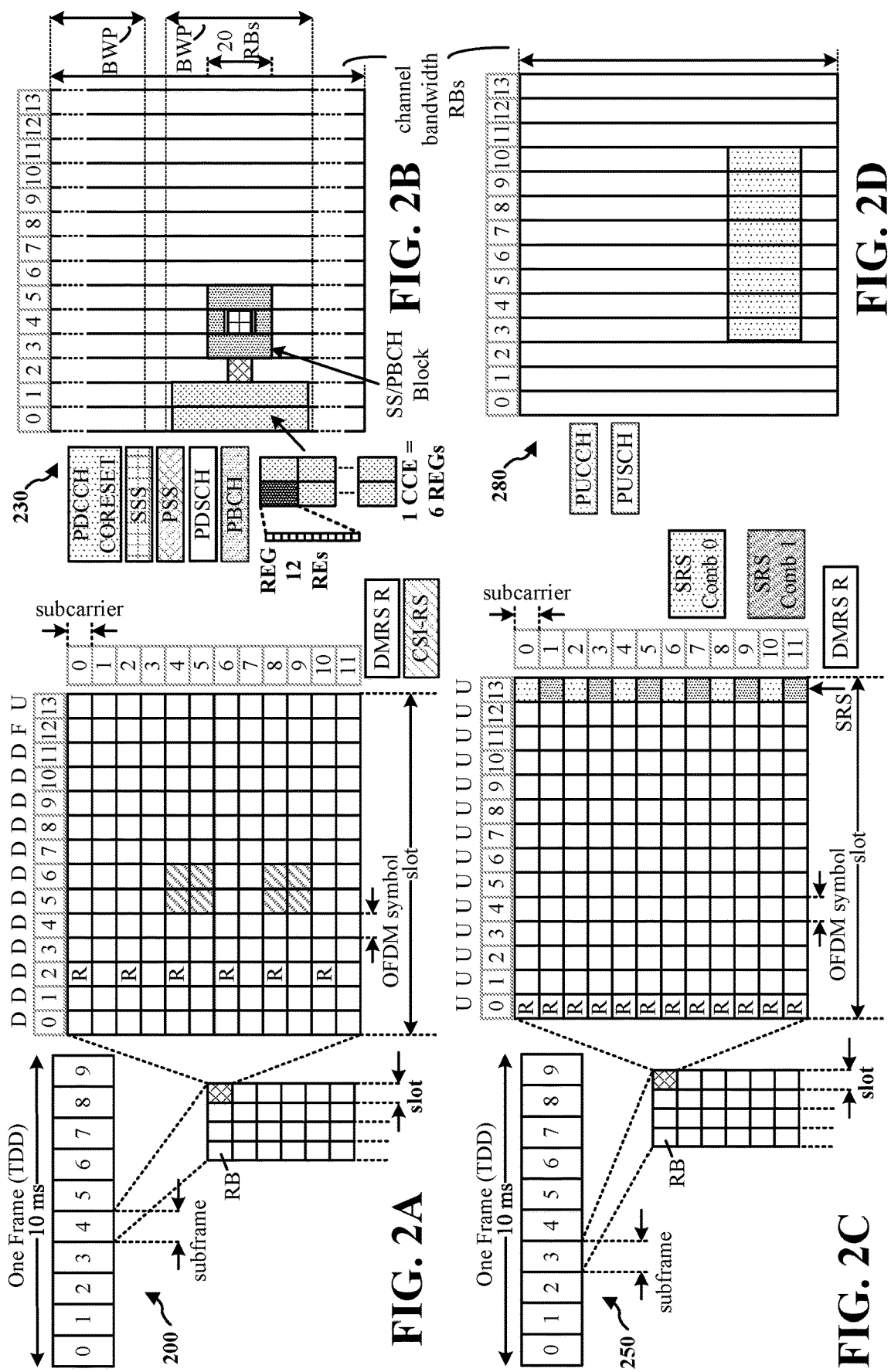
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^{\mu} \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
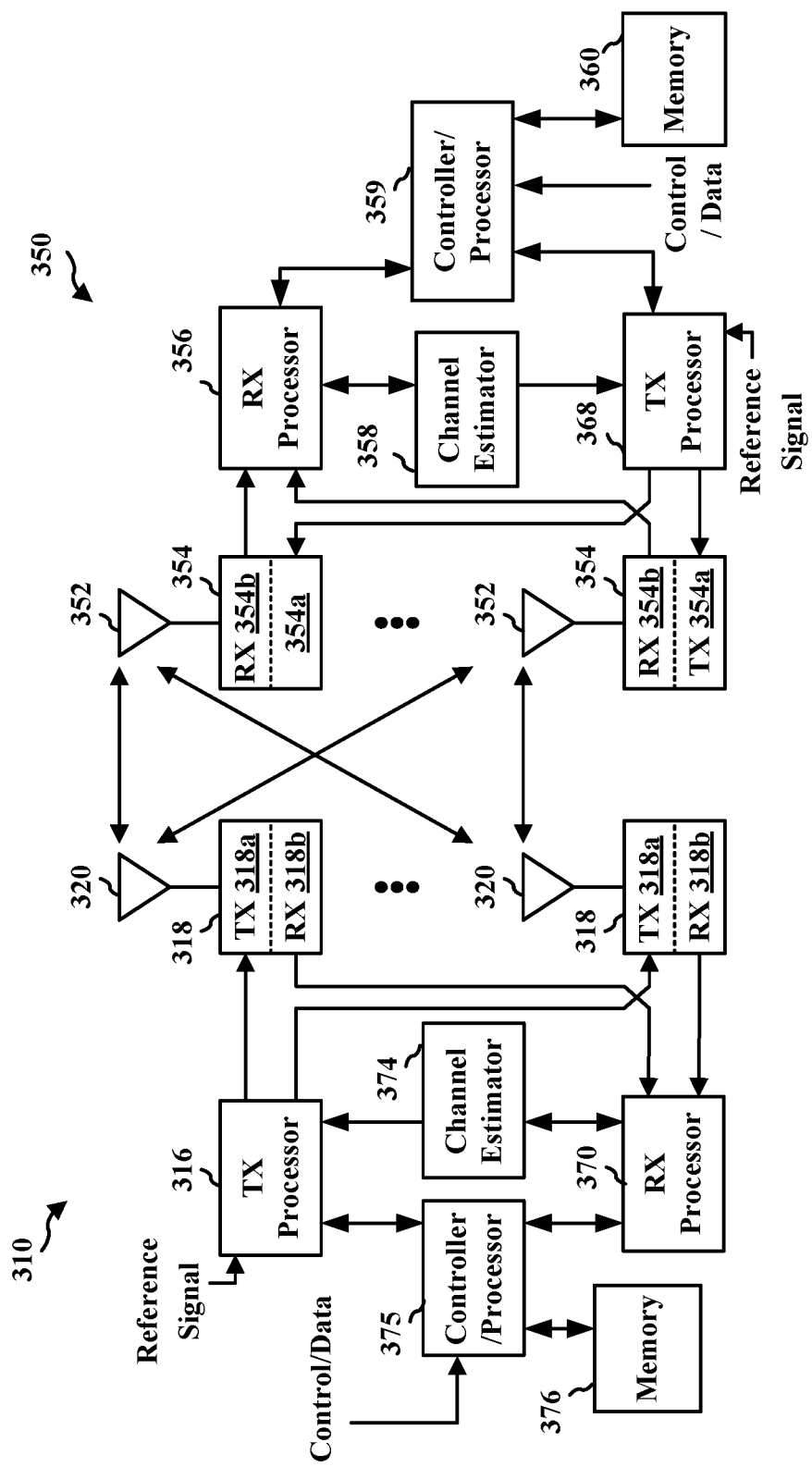
FIG. 3 is a diagram illustrating an example of a base station and a UE in an access network.

FIG. 3 is a block diagram that illustrates an example of a first wireless device that is configured to exchange wireless communication with a second wireless device. In the illustrated example, the first wireless device may comprise a base station 310, the second wireless device may comprise a UE 350, and the base station 310 may be in communication with the UE 350 in an access network. As shown in FIG. 3, the base station 310 includes a transmit processor (TX processor 316), a transceiver 318 including a transmitter 318*a* and a receiver 318*b*, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSRK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate a radio frequency (RF) carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Aspects in connection with the DMRS handling component 198 of FIG. 1 may be performed by at least one of the TX processor 368, the RX processor 356, and the controller/processor 359, and/or by at least one of the TX processor 316, the RX processor 370, and the controller/processor 375.

Aspects in connection with the DMRS configuration component 199 of FIG. 1 may be performed by at least one of the TX processor 316, the RX processor 370, and the controller/processor 375, and/or by at least one of the TX processor 368, the RX processor 356, and the controller/processor 359.

In wireless communications, a waveform may refer to the signal that is mixed with information before being radiated across an air-interface. In some examples, the waveform may include a multiple carrier waveform. Multiple carrier waveforms may be implemented via orthogonal frequency division multiplexing (OFDM) modulation. Examples of multiple carrier waveforms include cyclic prefix (CP) OFDM (CP-OFDM) and discrete Fourier transform (DFT) spread OFDM (DFT-s-OFDM). Applying CP-OFDM may be beneficial for high throughput scenarios, while applying DFT-s-OFDM may be beneficial for power limited scenarios or when limited to a single stream transmission. That is, CP-OFDM may provide improved throughputs and capacity, while DFT-s-OFDM may provide improved coverage.

OFDM can facilitate transferring large numbers of modulation symbols simultaneously by multiplexing large numbers of subcarriers. These subcarriers may be tightly packed to achieve high spectrum efficiency. Each subcarrier may accommodate one modulation symbol within the duration of one time-domain OFDM symbol. A Fast Fourier Transform (FFT) operation may be used to generate the time-domain OFDM symbol from a combination of the modulated subcarriers.

Another example of a waveform that may be applied to a transmission is a single carrier (SC) waveform. SC waveforms include DFT-s-OFDM waveforms, for which a pulse-shaping filter is set to zero to shape the transmission, and QAM waveforms. QAM waveforms may be implemented via a pulse-shaping filter at a transmitting device and the pulse-shaping filter may be implemented in the time-domain.

Single carrier waveforms may be used for downlink transmissions and/or uplink transmissions. Compared to multiple carrier waveforms (e.g., OFDM waveforms), SC waveforms may be associated with a relatively lower Peak to Average Power Ratio (PAPR). A lower PAPR associated with a transmission may provide better power efficiency, which may improve link budget and provide better coverage. Additionally, SC waveforms may provide increased flexibility in implementation compared to multiple carrier waveforms. For example, with SC waveforms, transmission and reception may be performed via an FFT operation. When operating in higher frequency bands with wide channel bandwidth, the performing of the FFT operations may not be resource friendly. For example, as the bandwidth increases, the quantity of FFT operations also increases, which may result in increased resource utilization (e.g., processing power), for example, at the receiving device.

In a wireless communication environment, a set of resources may be allocated for UL transmissions and/or DL transmissions between a UE and a base station. For some deployment environments of the UE, the allocated resources may result in interference at the UE. The UE may use demodulation reference signals (DMRSs) to measure channel conditions and to help demodulate the channel. For example, the UE may use DMRS for a DL control channel to estimate the propagation channel experienced by the DL control channel. The UE may use the resultant information to help demodulate the DL control channel (e.g., use the measured channel conditions to perform equalization on the DL control channel) and to subsequently decode downlink control information. The configuration (or placement) of the DMRS may be semi-static (e.g., based on RRC signaling) and enable the UE to perform channel estimations.

In some examples, intra-symbol multiplexing of reference signals and a channel may be performed when using SC waveforms. For example, DMRS may be multiplexed with a channel in the time-domain of an SC waveform. In such examples, time-division multiplexing may be performed so that the DMRS and the channel are included in a same symbol of the SC waveform. Examples of the channel include a traffic channel, a control channel (e.g., PDCCH or PUCCH), or a data channel (e.g., PDSCH or PUSCH).

Intra-symbol multiplexing may be useful, for example, when a data transmission has a limited number of symbols (e.g., PBCH), or when a control channel or a data channel spans a small number of symbols (e.g., with a small number of payloads). In addition, intra-band multiplexing using reference signals may be useful to provide multiple opportunities to receive the reference signal to determine the effects of time-varying channels (e.g., channels for which conditions may change over time), to improve frequency tracking loops (FTL), to improve phase noise compensation, etc. However, using symbol-level multiplexing may result in non-trivial overhead, for example, between a transmitting device and a receiving device.

In some examples, DMRS may be front-loaded within a slot. For example, in a slot that includes 14 symbols, the second symbol or the third symbol may be allocated to DMRS. However, in such examples, the DMRS may be allocated to one symbol, which limits tracking time-varying characteristics on the channel.

Aspects disclosed herein provide techniques for facilitating intra-symbol multiplexing between DMRS and other signals of an SC waveform. For example, disclosed technique utilizes a time-domain DMRS pattern that indicates a starting location and a duration of the DMRS of a symbol. The time-domain DMRS pattern may enable a network to control overhead, for example, with respect to the DMRS. The time-domain DMRS pattern may additionally or alternatively enable the network to apply an applicable configuration based on a target use case. For example, if channel conditions are good, then the network may utilize a time-domain DMRS pattern in which resources allocated to DMRS are reduced compared to scenarios in which channel conditions are poor or less than good. In some examples, the time-domain DMRS pattern may facilitate allocating less than all of the resources of a symbol to DMRS (e.g., the DMRS may be allocated to a portion of the resources of the symbol). In some examples, based on the time-domain DMRS pattern, the DMRS may be repeated across symbols.

Figure 5:
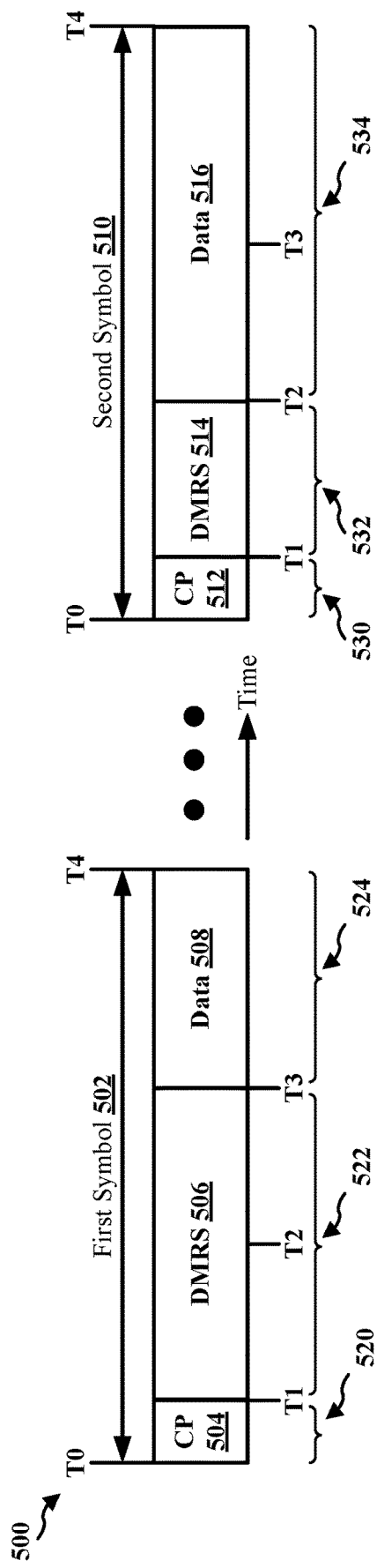
FIG. 5 illustrates an example of intra-symbol multiplexing of DMRS and data utilizing time-varying DMRS densities, in accordance with various aspects of the present disclosure.
Figure 6:
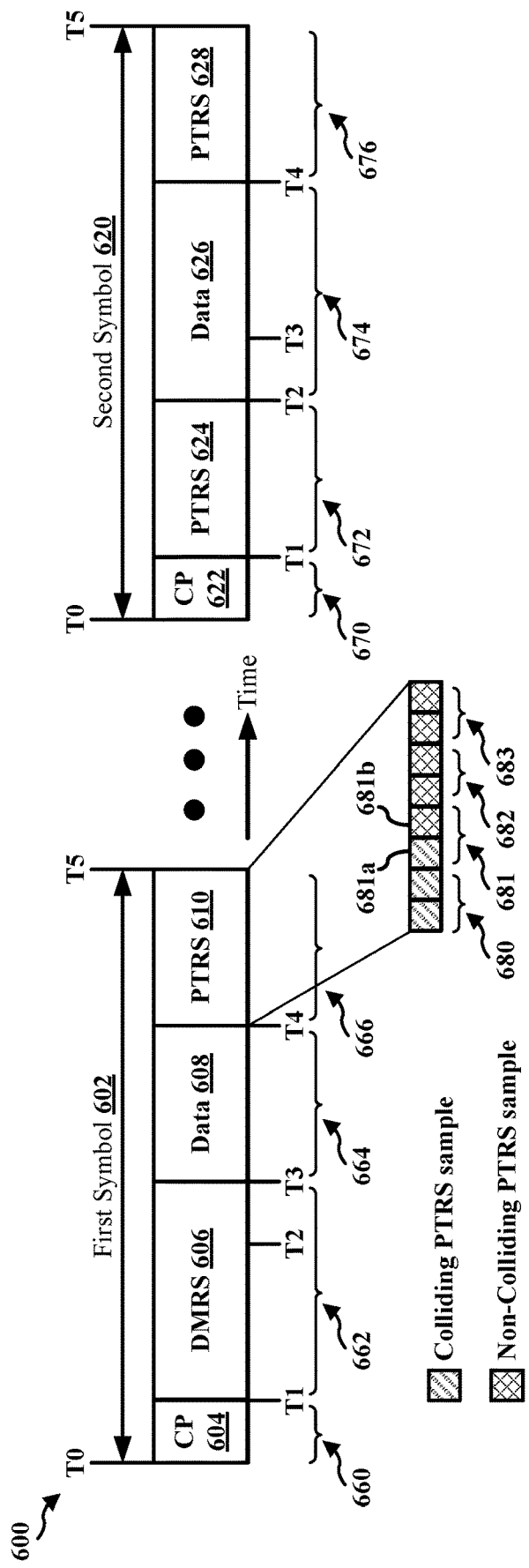
FIG. 6 illustrates an example of intra-symbol multiplexing of DMRS and phase-tracking reference signals (PTRS) for a single carrier waveform, in accordance with various aspects of the present disclosure.
Figure 7:
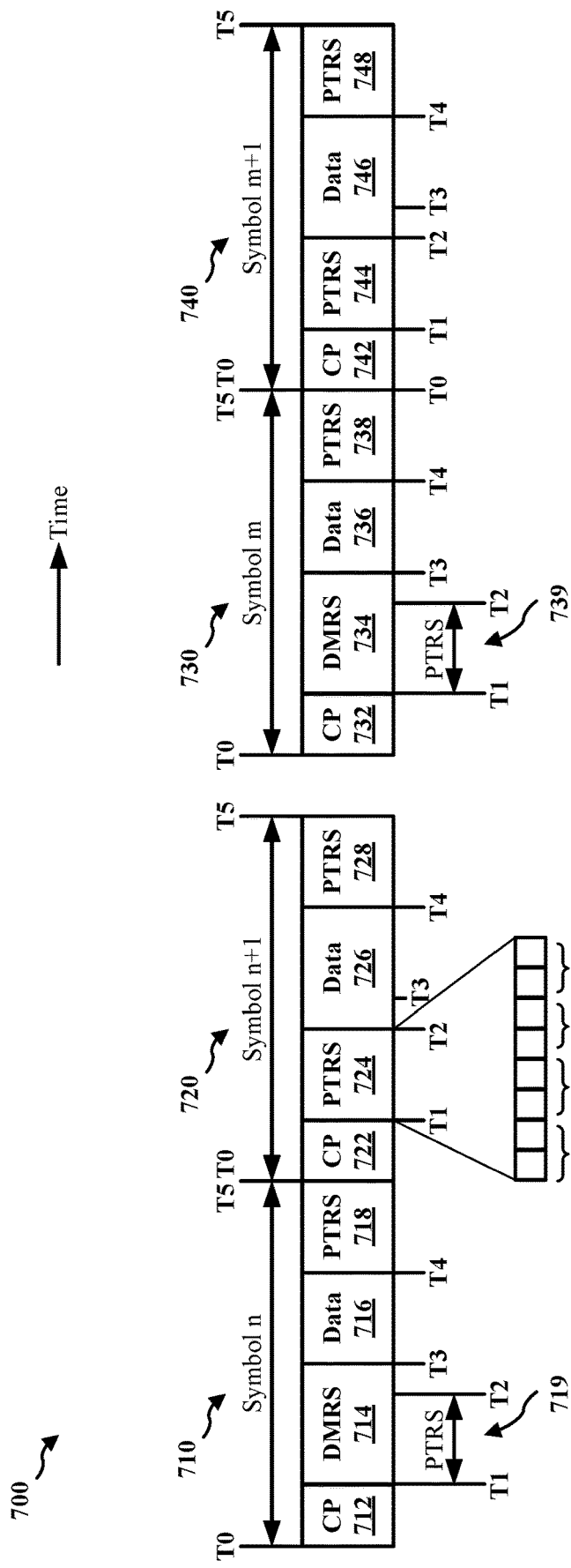
FIG. 7 illustrates an example of intra-symbol multiplexing of DMRS and PTRS for a single carrier waveform, in accordance with various aspects of the present disclosure.

In some examples, the time-domain DMRS pattern may facilitate time-varying DMRS locations. For example, different symbols may include different starting points for the respective DMRS. FIGS. 4A, 4B, and 4C illustrate examples of intra-symbol multiplexing of DMRS and data utilizing time-varying DMRS locations. In some examples, the time-domain DMRS pattern may facilitate time-varying DMRS densities. For example, different symbols may include DMRS portions that start at the same location, but are associated with different durations. FIG. 5 illustrates an example of intra-symbol multiplexing of DMRS and data utilizing time-varying DMRS densities. In some examples, the time-domain DMRS pattern may facilitate multiplexing DMRS and another reference signal in a same symbol. For example, FIGS. 6 and 7 illustrate examples of intra-symbol multiplexing between DMRS resources and PTRS resources.

Symbols of the illustrated examples of FIGS. 4A, 4B, 4C, and 5 include at least a CP portion, a DMRS portion, and a data portion. Symbols of the illustrated examples of FIGS. 6 and 7 include one or more of a CP portion, a DMRS portion, a data portion, and a PTRS portion. In some examples, the symbols are part of a same slot of an SC waveform. In other examples, the symbols are part of different slots of an SC waveform.

In the illustrated examples of FIGS. 4A, 4B, 4C, 5, 6, and 7, the CP portions of the respective symbols facilitate performing frequency-domain equalization at the receiving device. For example, the CP portions facilitate performing single-tap equalization. When a symbol does not include a CP portion, the receiving device may perform time-domain equalization, which may increase complexity due to performing multiple-tap equalization.

In the illustrated examples of FIGS. 4A, 4B, 4C, 5, 6, and 7, the portions of the respective symbols are associated with durations based on a starting time and an ending time. As used herein, a same time indicated in the symbols corresponds to a same time-domain resource and may be referred to as being "aligned." For example, a time T1 indicated in a first symbol is associated with a same time-domain resource as the time T1 indicated in a second symbol. Thus, durations based on the same starting time and ending time may be a same duration. For example, if a portion in a first symbol spans from a time T0 to a time T1, and a portion in a second symbol also spans from a time T0 to a time T1, then the durations of the respective portions are the same.

Although the examples of FIGS. 4A, 4B, 4C, 5, 6, and 7 illustrate performing intra-symbol multiplexing of DMRS and data or PTRS using time-division multiplexing, other examples may include performing intra-symbol multiplexing of DMRS and data or PTRS using code-domain multiplexing or space-domain multiplexing. Moreover, although not shown, it may be appreciated that there may be a gap (also referred to as a "guard-interval") or an additional CP portion embedded with (or appended to) the DMRS portion, the data portion, and/or the PTRS portion within a same symbol to facilitate the orthogonality of the respective portions once the symbol passes through the air-interface.

As shown in FIGS. 4A, 4B, and 4C, the DMRS portion is located at different locations in different symbols. Different DMRS locations for the respective DMRS portions may enable improving frequency error estimates, for example, when the DMRS portions are located relatively far apart. Additionally, different DMRS locations for the respective DMRS portions may enable improving time domain code-domain multiplexing (CDM), for example, when the DMRS portions are located relatively closer.

FIG. 4A depicts an example 400 including a first symbol 402 and a second symbol 410, as presented herein. The first symbol 402 includes a first symbol CP portion 404, a first symbol DMRS portion 406, and a first symbol data portion 408. The example second symbol 410 includes a second symbol CP portion 412, a second symbol data portion 414, and a second symbol DMRS portion 416. The first symbol CP portion 404, the first symbol DMRS portion 406, and the first symbol data portion 408 may occupy respective sets of resources (e.g., one or more resource elements (REs) in the time-domain). In the example of FIG. 4A, the first symbol CP portion 404 is allocated resources (e.g., time-domain resources) associated with a first duration 405 starting at time T0 and ending at time T1, the first symbol DMRS portion 406 is allocated resources associated with a second duration 407 starting at time T1 and ending at time T3, and the first symbol data portion 408 is associated with a third duration 409 starting at time T3 and ending at time T4. Similarly, the second symbol CP portion 412, the second symbol data portion 414, and the second symbol DMRS portion 416 may occupy respective sets of resources (e.g., one or more REs in the time-domain). For example, the second symbol CP portion 412 is allocated resources associated with a fourth duration 413 starting at time T0 and ending at time T1, the second symbol data portion 414 is allocated resources associated with a fifth duration 415 starting at time T1 and ending at time T2, and the second symbol DMRS portion 416 is associated with a sixth duration 417 starting at time T2 and ending at time T4.

FIG. 4B depicts an example 420 including a first symbol 422 and a second symbol 430, as presented herein. The first symbol 422 includes the first symbol CP portion 404, the first symbol DMRS portion 406, and the first symbol data portion 408. The example second symbol 430 includes the second symbol CP portion 412, the second symbol data portion 414, and the second symbol DMRS portion 416. Similar to the example of FIG. 4A, the different portions of FIG. 4B may occupy respective sets of resources within each symbol. For example, in the illustrated example of FIG. 4B, the first symbol CP portion 404 is allocated resources associated with a first duration 424 starting at time T0 and ending at time T1, the first symbol data portion 408 is allocated resources associated with a second duration 426 starting at time T1 and ending at time T2, and the first symbol DMRS portion 406 is associated with a third duration 428 starting at time T2 and ending at time T4. Additionally, the second symbol CP portion 412 is allocated resources associated with a fourth duration 432 starting at time T0 and ending at time T1, the second symbol DMRS portion 416 is allocated resources associated with a fifth duration 434 starting at time T1 and ending at time T3, and the second symbol data portion 414 is associated with a sixth duration 436 starting at time T3 and ending at time T4.

FIG. 4C depicts an example 440 including a first symbol 442 and a second symbol 450, as presented herein. The first symbol 442 includes the first symbol CP portion 404, the first symbol DMRS portion 406, and first symbol data (e.g., data portions 408a, 408b). The example second symbol 430 includes the second symbol CP portion 412, second symbol data (e.g., data portions 414a, 414b), and the second symbol DMRS portion 416. Similar to the examples of FIGS. 4A and 4B, the different portions of FIG. 4C may occupy respective sets of resources within each symbol. For example, in the illustrated example of FIG. 4C, the first symbol CP portion 404 is allocated resources associated with a first duration 460 starting at time T0 and ending at time T1, a first data portion 408a is allocated resources associated with a second duration 462 starting at time T1 and ending at time T2, the first symbol DMRS portion 406 is allocated resources associated with a third duration 464 starting at time T2 and ending at time T4, and a second data portion 408b is allocated resources associated with a fourth duration 466 starting at time T4 and ending at time T6. Additionally, the second symbol CP portion 412 is allocated resources associated with a fifth duration 470 starting at time T0 and ending at time T1, a first data portion 414a is allocated resources associated with a sixth duration 472 starting at time T1 and ending at time T3, the second symbol DMRS portion 416 is allocated resources associated with a seventh duration 474 starting at time T3 and ending at time T5, and a second data portion 414b is allocated resources associated with an eight duration 476 starting at time T5 and ending at time T6.

In the illustrated examples of FIGS. 4A, 4B, and 4C, the DMRS portions 406, 416 are associated with a same density (sometimes referred to as a "duration" or a "length"). For example, the first symbol DMRS portion 406 and the second symbol DMRS portion 416 may be associated with a same quantity of resources (e.g., a same quantity of REs or a same quantity of samples). For example, in FIG. 4A, the second duration 407 and the sixth duration 417 may be a same duration. In the example of FIG. 4B, the third duration 428 and the fifth duration 434 may be a same duration. Similarly, in the example of FIG. 4C, the third duration 464 and the seventh duration 474 may be a same duration.

However, the starting point of the respective DMRS portions 406, 416 may differ with respect to the first symbol and the second symbol. For example, in the example of FIG. 4A, the first symbol DMRS portion 406 starts at time T1 (e.g., positioned after the first symbol CP portion 404), and the second symbol DMRS portion 416 starts at time T2 (e.g., positioned after the second symbol data portion 414). In the example of FIG. 4B, the first symbol DMRS portion 406 starts at time T2 (e.g., positioned after the first symbol data portion 408), and the second symbol DMRS portion 416 starts at time T1 (e.g., positioned after the second symbol CP portion 412). In the example of FIG. 4C, the first symbol DMRS portion 406 starts at time T2, and the second symbol DMRS portion 416 starts at time T3.

In the illustrated examples of FIGS. 4A, 4B, and 4C, the DMRS portions 406, 416 may be derived from a same known sequence. Thus, the first symbol DMRS portion 406 and the second symbol DMRS portion 416 may include a repetition of resource elements (or samples) in the different symbols. Repeating the DMRS across symbols may facilitate improving equalization and tracking. For example, and referring to the example of FIG. 4A, a receiving device may receive a single carrier waveform including the first symbol 402 and the second symbol 410. The receiving device may decode the first symbol 402 and use samples of the first symbol DMRS portion 406 to estimate channel conditions. The estimated channel conditions may facilitate the receiving device in performing equalization and with decoding the first symbol data portion 408. When the DMRS is not repeated across symbols, the receiving device may use the estimated channel conditions for performing the equalization on and decoding for subsequent symbols until a new DMRS is received. However, when the DMRS is repeated across symbols, the receiving device may use the repetition to improve (e.g., fine-tune) the estimated channel conditions. For example, the receiving device may use the samples of the second symbol DMRS portion 416 to improve the channel conditions estimated using the samples of the first symbol DMRS portion 406. That is, in the example of FIG. 4A, if there is an additional symbol located between the first symbol 402 and the second symbol 410, the receiving device may use the samples of the first symbol DMRS portion 406 to estimate channel conditions, and use the estimated channel conditions to perform the equalization and the decoding for the first symbol data portion 408 and the additional symbol. The receiving device may then use the samples of the second symbol DMRS portion 416 to improve the channel conditions estimated at the first symbol to facilitate the performing of the equalization and the decoding for subsequent symbols after the second symbol 410.

In the illustrated examples of FIGS. 4A, 4B, and 4C, the DMRS portions are associated with a same density, but the starting point of the respective DMRS portions may differ with respect to the first symbol and the second symbol. In another aspect, the starting position of the DMRS portions across symbols may be a same starting position, but the densities of the respective DMRS portions may be different densities.

FIG. 5 illustrates an example 500 of intra-symbol multiplexing of DMRS and data utilizing time-varying DMRS densities, as presented herein. For example, the example of FIG. 5 includes a first symbol 502 and a second symbol 510. Similar to the examples of FIGS. 4A, 4B, and 4C, the symbols 502, 510 includes at least a CP portion, a DMRS portion, and a data portion. In some examples, the first symbol 502 and the second symbol 510 are part of a same slot of an SC waveform. In other examples, the first symbol 502 and the second symbol 510 are part of different slots of an SC waveform.

As shown in FIG. 5, the first symbol 502 includes a first symbol CP portion 504, a first symbol DMRS portion 506, and a first symbol data portion 508. The example second symbol 510 includes a second symbol CP portion 512, a second symbol DMRS portion 514, and a second symbol data portion 516. Similar to the examples of FIGS. 4A, 4B, and 4C, the first symbol CP portion 504, the first symbol DMRS portion 506, and the first symbol data portion 508 may occupy respective sets of resources (e.g., one or more resource elements (REs) in the time-domain). In the example of FIG. 5, the first symbol CP portion 504 is allocated resources (e.g., time-domain resources) associated with a first duration 520 starting at time T0 and ending at time T1, the first symbol DMRS portion 506 is allocated resources associated with a second duration 522 starting at time T1 and ending at time T3, and the first symbol data portion 508 is associated with a third duration 524 starting at time T3 and ending at time T4. Similarly, the second symbol CP portion 512, the second symbol DMRS portion 514, and the second symbol data portion 516 may occupy respective sets of resources (e.g., one or more REs in the time-domain). For example, the second symbol CP portion 512 is allocated resources associated with a fourth duration 530 starting at time T0 and ending at time T1, the second symbol DMRS portion 514 is allocated resources associated with a fifth duration 532 starting at time T1 and ending at time T2, and the second symbol data portion 516 is associated with a sixth duration 534 starting at time T2 and ending at time T4.

As shown in FIG. 5, the DMRS portions start at a same location in the first symbol 502 and the second symbol 510 (e.g., at time T1), but the densities associated with the respective DMRS portions are different. Using a same DMRS starting location and different densities may enable better overhead control for the DMRS compared to the examples of FIGS. 4A, 4B, and 4C. For example, in the examples of FIGS. 4A, 4B, and 4C, the transmitting device may signal to the receiving device the starting location and duration of each DMRS portion. In the example of FIG. 5, the transmitting device may signal to the receiving device the duration of each DMRS portion and may forego signaling the starting location of the DMRS portion.

Additionally, the initial DMRS may be used to estimate channel conditions and the additional DMRS may be used to track changes in channel conditions and, thus, the additional DMRS may be more light-weight and may have a smaller density than the initial DMRS. For example, the duration associated with the first symbol DMRS portion 506 (e.g., the second duration 522) may be longer than the duration associated with the second symbol DMRS portion 514 (e.g., the fifth duration 532). The longer duration or the greater density associated with the first symbol DMRS portion 506 may facilitate a robust channel conditions estimation by the receiving device. The receiving device may then use the DMRS in the subsequent symbols (e.g., the second symbol DMRS portion 514) to better compensate for time-variation, such as phase noise or frequency errors.

As shown in FIG. 5, the DMRS portions of the first symbol 502 and the second symbol 510 have different durations. In some such examples, it may be appreciated that the second symbol DMRS portion 514 is not a repetition of the first symbol DMRS portion 506. Thus, in some examples, channel condition estimates using the second symbol DMRS portion 514 may be not be as robust as the channel conditions estimates using the first symbol DMRS portion 506. However, the example techniques of utilizing time-varying DMRS densities, as shown in FIG. 5, may provide improved overhead control for DMRS. Additionally, the receiving device may still use the second symbol DMRS portion 514 to improve the channel conditions estimated using the samples of the first symbol DMRS portion 506.

In some examples, the transmitting device may determine whether to use time-varying DMRS locations, as shown in FIGS. 4A, 4B, and 4C, or to use time-varying DMRS densities, as shown in FIG. 5, based on the channel conditions. For example, when channel conditions are poor, the transmitting device may determine to use repetitions of the DMRS. In some such examples, the transmitting device may determine to use time-varying DMRS locations as the repetition and the different starting locations may increase the likelihood of the receiving device receiving the DMRS and may improve the channel conditions estimations performed by the receiving device.

In examples in which the channel conditions are good, the transmitting device may determine to reduce resources allocated to DMRS. In some such examples, the transmitting device may determine to use time-varying DMRS densities as the reduced resources allocated to DMRS in subsequent symbols allows for the transmitting device to allocate more resources of a symbol to other signals, such as data or control information, thereby improving throughput, capacity, and/or spectral efficiency.

As shown in FIGS. 4A, 4B, 4C, and 5, intra-symbol multiplexing may be used to include DMRS and data within a same symbol of a single carrier waveform. That is, the DMRS may not span the full duration of the symbol. In some examples, it may be beneficial to multiplex the DMRS with another reference signal. For example, the DMRS may be multiplexed with PTRS to improve phase noise compensation (e.g., to reduce the impact of phase noise).

A wireless channel may introduce frequency impairments, such as a Doppler shift. However, an additional source of frequency impairment may be introduced, for example, due to components at the transmitting device and/or the receiving device. For example, an oscillator may introduce phase noise at the transmitting device and/or the receiving device. Phase noise may introduce common phase error or other phase noise errors into a transmitted signal (e.g., by a transmitting device), which degrades demodulation performance (e.g., at a receiving device). A PTRS may enable a receiving device to track phase noise. Additionally, PTRS may be useful when operating at higher frequencies (e.g., FR2, FR4, etc.) as the oscillators become a bottle neck for performance based on the phase noise that the oscillator introduces. The PTRS may use used to track phase noise and to suppress such phase noise, especially at higher frequency ranges.

PTRS may be inserted into a symbol (e.g., an OFDM symbol) in the form of one or more groups of PTRS resources. A group of PTRS resources (sometimes referred to as a "chunk" or a "burst") may refer to a quantity of samples that are inserted into a PTRS-containing symbol. Similar to the DMRS, the PTRS resources may be derived from a sequence, such as a Zadoff-Chu sequence, a binary phase-shift keying (BPSK) sequence, an m-sequence, etc. A group of PTRS resources may include a particular quantity of samples (sometimes referred to as a "chunk size" or a "burst size"), such as two samples or four samples. Additionally, a PTRS-containing symbol may support a particular quantity of groups of PTRS resources (sometimes referred to as a "number of chunks per symbol" or a "number of bursts per symbol"), such as two groups of PTRS resources, four groups of PTRS resources, or eight groups of PTRS resources.

FIG. 6 illustrates an example 600 of intra-symbol multiplexing of DMRS and PTRS for a single carrier waveform, as presented herein. For example, the example of FIG. 6 includes a first symbol 602 and a second symbol 620. Similar to the examples of FIGS. 4A, 4B, 4C, and 5, in some examples, the first symbol 602 and the second symbol 620 are part of a same slot of an SC waveform. In other examples, the first symbol 602 and the second symbol 620 are part of different slots of an SC waveform.

As shown in FIG. 6, the first symbol 602 includes a first symbol CP portion 604, a first symbol DMRS portion 606, a first symbol data portion 608, and a first symbol PTRS portion 610. The example second symbol 620 includes a second symbol CP portion 622, a first PTRS portion 624, a second symbol data portion 626, and a second PTRS portion 628. Similar to the examples of FIGS. 4A, 4B, 4C, and 5, the portions of the first symbol 602 and the second symbol 620 may occupy respective sets of resources (e.g., one or more resource elements (REs) in the time-domain). In the example of FIG. 6, the first symbol CP portion 604 is allocated resources (e.g., time-domain resources) associated with a first duration 660 starting at time T0 and ending at time T1, the first symbol DMRS portion 606 is allocated resources associated with a second duration 662 starting at time T1 and ending at time T3, the first symbol data portion 608 is associated with a third duration 664 starting at time T3 and ending at time T4, and the first symbol PTRS portion 610 is associated with a fourth duration 666 starting at time T4 and ending at time T5. Similarly, the second symbol CP portion 622 is allocated resources associated with a fifth duration 670 starting at time T0 and ending at time T1, the first PTRS portion 624 is allocated resources associated with a sixth duration 672 starting at time T1 and ending at time T2, the second symbol data portion 626 is associated with a seventh duration 674 starting at time T2 and ending at time T4, and the second PTRS portion 628 is associate with an eighth duration 676 starting at time T4 and ending at time T5.

The first symbol DMRS portion 606 within the first symbol 602 may be based on a time-domain DMRS pattern, as described in connection with the examples of FIGS. 4A, 4B, 4C, and/or 5. As shown in FIG. 6, DMRS resources and PTRS resources are time-domain multiplexed in a same symbol. Using intra-symbol multiplexing of DMRS resources and PTRS resources may facilitate improving phase noise compensation. For example, the receiving device may use the DMRS resources and the PTRS resources to measure phase noise on a channel.

In some examples, one or more DMRS resources may collide, or may potentially collide, with one or more PTRS resources. For example, the transmitting device may identify and configure a time-domain DMRS pattern for a receiving device. The transmitting device may also identify and configure a PTRS pattern for the receiving device. When transmitting a single carrier waveform to the receiving device, the transmitting device may identify a potential collision between the DMRS and the PTRS based on the time-domain DMRS pattern and the PTRS pattern. Additionally, the receiving device may identify a potential collision between DMRS and PTRS based on the configured time-domain DMRS pattern and the configured PTRS pattern. Additionally, or alternatively, in some examples, when the receiving device receives a single-carrier waveform including an intra-symbol multiplexing between DMRS and PTRS, one or more DMRS resources may overlap with one or more PTRS resources, for example, due to the delay-spread of the channel.

In some examples in which the PTRS collides with (or may potentially collide with) DMRS, the DMRS may puncture the PTRS. In such examples, the DMRS may be prioritized over the PTRS. In some examples, the DMRS may puncture the PTRS at a sample-level or a resource element-level. For example, the colliding (or potentially colliding) time-domain samples or resource elements may not be used for PTRS. In such examples, time-domain samples or resources of PTRS that are not colliding with DMRS may still be included in the symbol.

In some examples, the DMRS may puncture the PTRS at a group-level or a "chunk-level." For example, when the PTRS collides with (or may potentially collide with) DMRS, the PTRS may be excluded from the symbol. In examples in which the potential collision is identified, the resources allocated for the PTRS may be re-allocated. For example, the transmitting device may re-allocate the resources allocated to the group of PTRS resources to data and the receiving device may monitor for data at the resources initially allocated to the group of PTRS resources. In examples in which the collision is identified by the receiving device after transmission, the receiving device may discard the samples received at the resources allocated to the group of PTRS resources.

In some examples in which the PTRS collides with (or may potentially collide with) DMRS, the PTRS may puncture the DMRS. In such examples, the PTRS may be prioritized over the DMRS.

Referring again to the illustrated example 600 of FIG. 6, the first symbol PTRS portion 610 includes four chunks 680-683 of PTRS samples and each of the chunks 680-683 includes two samples. Thus, the length of the first symbol PTRS portion 610 in the example of FIG. 6 is eight samples (e.g., 4*2=8). In the illustrated example, the two samples of a first chunk 680 and a first sample 681a of a second chunk 681 are colliding PTRS samples, while a second sample 681b of the second chunk 681 and the two samples each of a third chunk 682 and a fourth chunk 683 are non-colliding PTRS samples.

In an example in which the DMRS punctures the PTRS at a sample-level or a resource element-level, the two samples of the first chunk 680 and the first sample 681a may be punctured by the DMRS. In an example in which the DMRS punctures the PTRS at a chunk-level, the chunks 680-683 may be punctured by the DMRS. In some such examples, the resources allocated to the non-colliding samples of the chunks 680-683 may be re-allocated, for example, to data. In an example in which the PTRS punctures the DMRS, the respective colliding resources of the first symbol DMRS portion 606 may be punctured.

In the example of FIG. 6, the PTRS and the DMRS may be derived from (or "drawn" from) different sequences. For example, the samples of the DMRS may be derived from a Zadoff-Chu sequence, and the samples of the PTRS may be derived from a BPSK sequence. In other examples, the PTRS and the DMRS may be derived from a same sequence. That is, the PTRS may be aligned with the DMRS from a sequence perspective. In such examples, the DMRS puncturing the PTRS at a sample-level or a resource element-level and the PTRS puncturing the DMRS may result in the same samples being decoded by the receiving device. In examples in which multiple DMRS are included in a single carrier waveform, the PTRS may be aligned with the closest DMRS in the time-domain.

FIG. 7 illustrates an example 700 of intra-symbol multiplexing of DMRS and PTRS for a single carrier waveform, as presented herein. For example, the example of FIG. 7 includes a first pair of consecutive symbols including a first symbol 710 ("Symbol n") and a second symbol 720 ("Symbol n+1"), and a second pair of consecutive symbols including a third symbol 730 ("Symbol m") and a fourth symbol 740 ("Symbol m+1"). In some examples, the first pair of consecutive symbols and the second pair of consecutive symbols are part of a same slot of an SC waveform. In other examples, the first pair of consecutive symbols and the second pair of consecutive symbols are part of different slots of an SC waveform.

As shown in FIG. 7, the first symbol 710 includes a first symbol CP portion 712, a first symbol DMRS portion 714, a first symbol data portion 716, and a first symbol PTRS portion 718. The example second symbol 720 includes a second symbol CP portion 722, a first PTRS portion 724, a second symbol data portion 726, and a second PTRS portion 728. The example third symbol 730 includes a third symbol CP portion 732, a third symbol DMRS portion 734, a third symbol data portion 736, and a third symbol PTRS portion 738. The example fourth symbol 740 includes a fourth symbol CP portion 742, a first PTRS portion 744, a fourth symbol data portion 746, and a second PTRS portion 748. Similar to the examples of FIGS. 4A, 4B, 4C, 5, and 6, the portions of the symbols 710, 720, 730, 740 may occupy respective sets of resources (e.g., one or more resource elements (REs) in the time-domain). The first symbol DMRS portion 714 within the first symbol 710 and/or the third symbol DMRS portion 734 within the third symbol 730 may be based on a time-domain DMRS pattern, as described in connection with the examples of FIGS. 4A, 4B, 4C, and/or 5.

Referring to the first pair of consecutive symbols (e.g., the first symbol 710 and the second symbol 720), the PTRS samples may be derived from a sequence of length being based on the number of chunks and the chunk size. For example, the first PTRS portion 724 of FIG. 7 is of length eight samples based on four chunks and a chunk size of two samples.

In some examples, the PTRS is repeated in each PTRS-containing symbol. For example, the first symbol PTRS portion 718, the first PTRS portion 724, and the second PTRS portion 728 may be the same samples drawn from a sequence that are repeated in the respective PTRS portions 718, 724, 728. In some examples, PTRS located at a same location across symbols may be drawn from a same sequence. For example, the first symbol PTRS portion 718 and the second PTRS portion 728 may be derived from a first sequence, while the first PTRS portion 724 may be derived from a second sequence that is different from the first sequence. In such examples, the first symbol PTRS portion 718 and the second PTRS portion 728 may be the same samples drawn from the first sequence.

In examples in which the PTRS and the DMRS are derived from a same sequence, a subset of the DMRS may be the same as the PTRS. For example, the first symbol DMRS portion 714 includes a resources subset 719 that aligns with the first PTRS portion 724. For example, the resources subset 719 occupies resources between time T1 and time T2 of the first symbol 710 and the first PTRS portion 724 occupies resources between time T1 and time T2 of the second symbol 720. In such examples, the resources of the resources subset 719 may be processed as PTRS to help the receiving device with phase noise compensation. Additionally, in examples in which the PTRS is repeated in each PTRS-containing symbol, the samples of the first PTRS portion 724 and the resources subset 719 are the same as the resources of the first symbol PTRS portion 718 and the second PTRS portion 728, which the receiving device may also use to improve the phase noise compensation.

In some examples, the DMRS may be repeated across symbols. For example, the first symbol DMRS portion 714 and the third symbol DMRS portion 734 may be the same resources sampled from a sequence. In such examples, the resources subset 719 and a second resources subset 739 of the third symbol DMRS portion 734 may also be the same resources.

In some examples, different sequences may be used for deriving the DMRS across symbols. For example, the first symbol DMRS portion 714 and the third symbol DMRS portion 734 may include different resources. In such examples, the second resources subset 739 may include the same resources as the first PTRS portion 744 of the fourth symbol 740.

In examples in which the reference signals (e.g., the DMRS and the PTRS) are derived from a same sequence, the first symbol DMRS portion 714 and the third symbol DMRS portion 734 include the same resources sampled from a sequence. Additionally, the resources subset 719, the first symbol PTRS portion 718, the first PTRS portion 724, the second PTRS portion 728, the second resources subset 739, the third symbol PTRS portion 738, the first PTRS portion 744, and the second PTRS portion 748 include the same resources sampled from the sequence.

Figure 8:
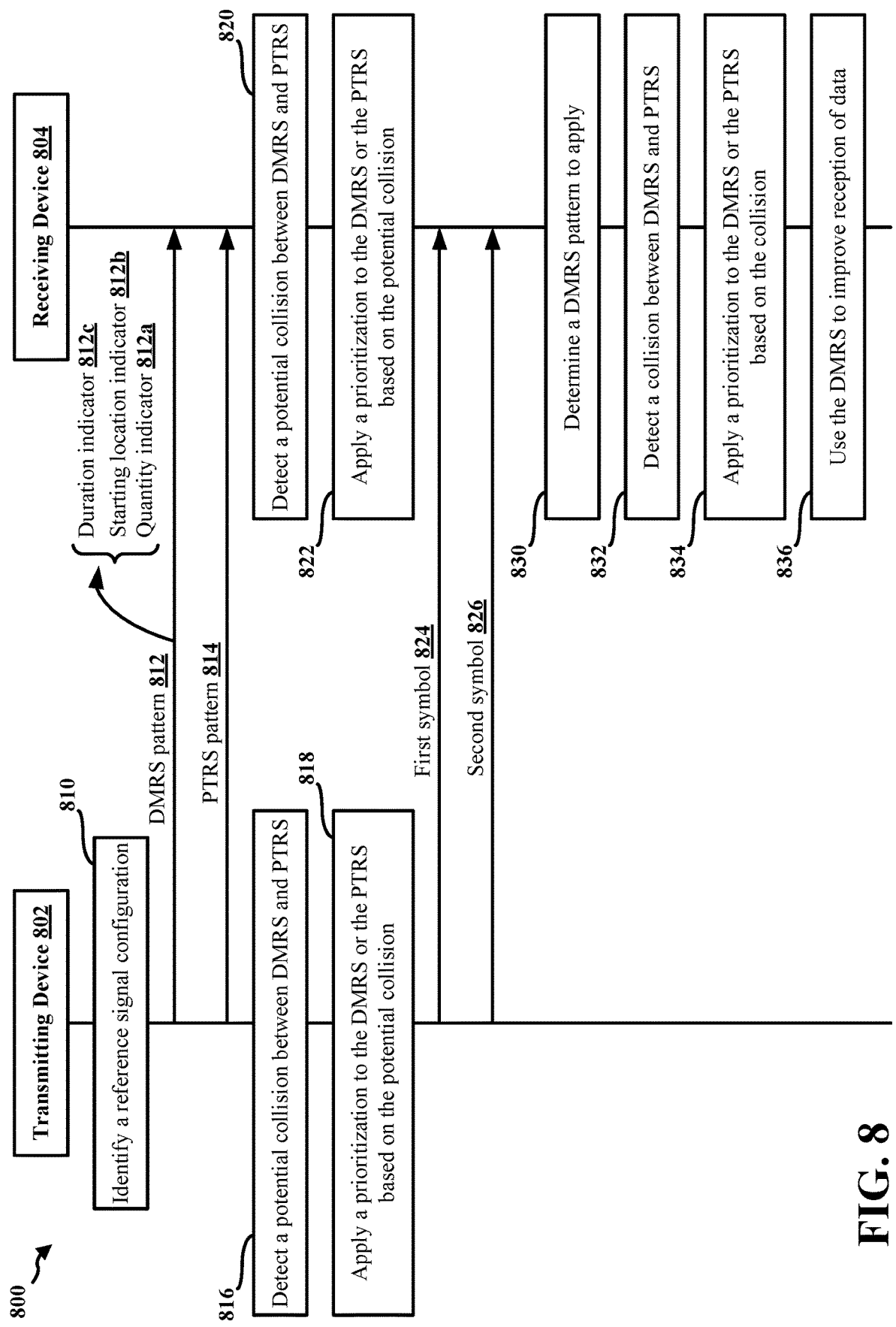
FIG. 8 is an example communication flow between a transmitting device and a receiving device, in accordance with the teachings disclosed herein.

FIG. 8 illustrates an example communication flow 800 between a transmitting device 802 and a receiving device 804, as presented herein. In the illustrated example, the communication flow 800 facilitates the use of time-varying reference signals with single carrier waveforms. Although not shown in the illustrated example of FIG. 8, it may be appreciated that in additional or alternative examples, the transmitting device 802 may be in communication with one or more other base stations or UEs, and/or the receiving device 804 may be in communication with one or more other base stations or UEs.

In some examples, the communication of a single carrier waveform may include a downlink transmission. For example, the transmitting device 802 may be implemented by a base station, such as the base station 102/180 of FIG. 1 and/or the base station 310 of FIG. 3, and the receiving device 804 may be implemented by a UE, such as the UE 104 of FIG. 1 and/or the UE 350 of FIG. 3. In some examples, the communication of a single carrier waveform may include an uplink transmission. For example, the transmitting device 802 may be implemented by a UE, such as the UE 104 of FIG. 1 and/or the UE 350 of FIG. 3, and the receiving device 804 may be implemented by a base station, such as the base station 102/180 of FIG. 1 and/or the base station 310 of FIG. 3.

At 810, the transmitting device 802 identifies a reference signal configuration to configure the receiving device 804. The reference signal configuration may include a DMRS pattern 812. As shown in FIG. 8, the transmitting device 802 transmits the DMRS pattern 812 that is received by the receiving device 804. Aspects of the DMRS pattern 812 are described in connection with the examples of FIGS. 4A, 4B, 4C, 5, 6, and/or 7. For example, the DMRS pattern 812 may indicate time-varying DMRS locations, as described in connection with the examples of FIGS. 4A, 4B, and 4B. In some examples, the DMRS pattern 812 may indicate time-varying DMRS densities, as described in connection with the examples of FIG. 5.

The DMRS pattern 812 may include one or more of a quantity indicator 812a, a starting location indicator 812b, and a duration indicator 812c. The quantity indicator 812a may indicate a quantity of symbols that contain DMRS, for example, within a slot. The starting location indicator 812b may indicate, for each symbol with DMRS (e.g., a DMRS-containing symbol), a starting time-domain resource element. For example, in the example of FIG. 4A, the starting location indicator 812b may indicate that the first symbol DMRS portion 406 starts at time T1 and that the second symbol DMRS portion 416 starts at time T2. The duration indicator 812c may indicate, for each DMRS-containing symbol, a duration of the respective DMRS portion. For example, in the example of FIG. 4A, the duration indicator 812c may indicate that the first symbol DMRS portion 406 is associated with the second duration 407 and the second symbol DMRS portion 416 is associated with the sixth duration 417.

The transmitting device 802 transmits a first symbol 824 that is received by the receiving device 804. The transmitting device 802 also transmits a second symbol 826 that is received by the receiving device 804. In some examples, the first symbol 824 and the second symbol 826 may be part of a same slot. In some examples, the first symbol 824 and the second symbol 826 may be part of different slots.

At 830, the receiving device 804 may determine a DMRS pattern to apply to facilitate receiving the DMRS resources. In some examples, the receiving device 804 may determine the DMRS pattern to apply based on the DMRS pattern 812. In some examples, the receiving device 804 may determine the DMRS pattern to apply based on a configuration. In some examples, the receiving device 804 may determine the DMRS pattern to apply based on a mapping (e.g., via a table). In some examples, the receiving device 804 may determine the DMRS pattern to apply based on control information. In some examples, the receiving device 804 may determine the DMRS pattern to apply based on an activation message. Aspects of determining the DMRS pattern are described in an example communication flow 900 of FIG. 9.

At 836, the receiving device 836 uses the DMRS, for example, based on the determined DMRS pattern, to improve reception of data. For example, the receiving device 836 may use the DMRS to estimate channel conditions and to equalize the channel to receive the data. In some examples, the receiving device 836 may use a second DMRS to improve the channel conditions estimation.

In some examples, the transmitting device 802 may determine to transmit PTRS to facilitate the receiving device 804 to perform phase noise compensation. In some examples, the transmitting device 802 may determine to transmit the PTRS with DMRS in a same symbol, as described in connection with the examples of FIGS. 6 and/or 7. In such examples, the reference signal configuration (e.g., at 810) may include a PTRS pattern 814. The PTRS pattern 814 may indicate locations and/or lengths of respective PTRS resources in PTRS-containing symbols. In some examples, the PTRS pattern 814 may indicate a quantity groups of PTRS resources (e.g., a number of chunks) and a size of each group of PTRS resources (e.g., a chunk size). The PTRS pattern 814 may indicate a location of PTRS resources relative to DMRS resources. As shown in FIG. 8, the transmitting device 802 may transmit the PTRS pattern 814 that is received by the receiving device 804.

At 816, the transmitting device 802 may detect a potential collision between DMRS and PTRS. For example, the transmitting device 802 may detect the potential collision based on the DMRS pattern 812 and the PTRS pattern 814.

At 818, the transmitting device 802 may apply a prioritization to the DMRS or the PTRS based on the potential collision. For example, the transmitting device 802 may determine to prioritize the DMRS. In some such example, the transmitting device 802 may puncture the PTRS. For example, the transmitting device 802 may puncture the PTRS at a colliding time-domain samples-level or resource element-level. In some examples, the transmitting device 802 may puncture the PTRS at a chunk-level. In some examples, the transmitting device 802 may determine to prioritize the PTRS. In some such examples, the transmitting device 802 may puncture the DMRS.

At 820, the receiving device 804 may detect a potential collision between DMRS and PTRS. For example, the receiving device 804 may detect the potential collision based on the DMRS pattern 812 and the PTRS pattern 814.

At 822, the receiving device 804 may apply a prioritization to the DMRS or the PTRS based on the potential collision. For example, the receiving device 804 may determine to prioritize the DMRS. In some such example, the receiving device 804 may puncture the PTRS. For example, the receiving device 804 may puncture the PTRS at a colliding time-domain samples-level or resource element-level. In some examples, the receiving device 804 may puncture the PTRS at a chunk-level. In some examples, the receiving device 804 may determine to prioritize the PTRS. In some such examples, the receiving device 804 may puncture the DMRS.

In some examples, portions of a symbol may overlap, for example, due to the delay-spread associated with a channel. For example, at 832, the receiving device 804 may detect a collision between the DMRS and the PTRS. At 834, the receiving device 804 may apply a prioritization to the DMRS or the PTRS based on the detected collision. For example, the receiving device 804 may determine to prioritize the DMRS. In some such example, the receiving device 804 may puncture the PTRS. For example, the receiving device 804 may puncture the PTRS at a colliding time-domain samples-level or resource element-level. In some examples, the receiving device 804 may puncture the PTRS at a chunk-level. In some examples, the receiving device 804 may determine to prioritize the PTRS. In some such examples, the receiving device 804 may puncture the DMRS.

Figure 9:
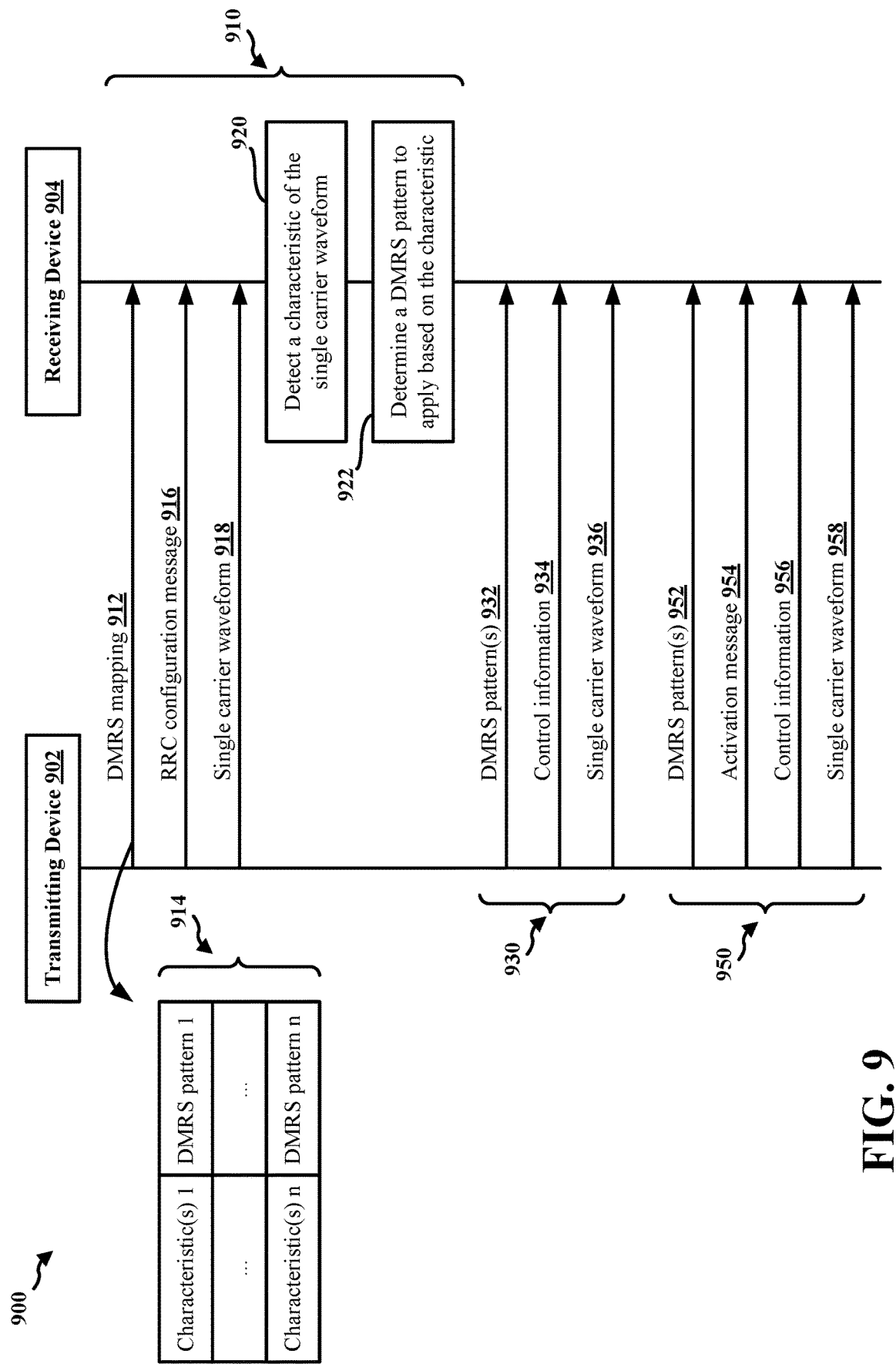
FIG. 9 is another example communication flow between a transmitting device and a receiving device, in accordance with the teachings disclosed herein.

FIG. 9 illustrates an example communication flow 900 between a transmitting device 902 and a receiving device 904, as presented herein. In the illustrated example, the communication flow 900 facilitates the use of time-varying reference signals with single carrier waveforms. Aspects of the transmitting device 902 may be implemented by the transmitting device 802 of FIG. 8. Aspects of the receiving device 904 may be implemented by the receiving device 804 of FIG. 8.

The example communication flow 900 of FIG. 9 provides different techniques for signaling the DMRS pattern being applied by the transmitting device 902 to single carries waveforms to the receiving device 904. For example, the example techniques of the communication flow 900 may facilitate the receiving device 804 receiving the DMRS pattern 812 and/or determining the DMRS pattern to apply (e.g., as described at 830 of FIG. 8). The example techniques of the communication flow 900 may enable the transmitting device 902 to control overhead signaling with the receiving device 904 associated with DMRS. Additionally, or alternatively, the example techniques of the communication flow 900 may enable the transmitting device 902 to apply an applicable DMRS pattern based on a target use case. For example, the transmitting device 902 may determine a DMRS pattern to use based on channel conditions, based on whether phase noise compensation may be beneficial for the receiving device 904 to perform to improve communication performance, etc.

In an example first aspect 910, the transmitting device 902 may configure the receiving device 904 via a mapping between one or more time-domain DMRS patterns and characteristics associated with a transmission. For example, the transmitting device 902 may transmit a DMRS mapping 912 that is received by the receiving device 904. The transmitting device 902 may transmit the DMRS mapping 912 via RRC signaling. For example, the transmitting device 902 may transmit the DMRS mapping 912 when establishing a connection with the receiving device 904 and/or when re-establishing a connection with the receiving device 904.

In some examples, the DMRS mapping 912 may include a table 914 that maps characteristics associated with a transmission to a time-domain DMRS pattern. Examples of characteristics associated with a transmission include data durations (e.g., a downlink data (PDSCH) duration and/or an uplink data (PUSCH) duration), a rank, etc.

As shown in FIG. 9, the transmitting device 902 may transmit a single carrier waveform 918 that is received by the receiving device 904. The single carrier waveform 918 may include one or more slots including one or more symbols, as described in connection with the examples of FIGS. 4A, 4B, 4C, 5, 6, 7, and/or 8.

At 920, the receiving device 904 detects a characteristic of the single carrier waveform 918. For example, the receiving device 904 may determine a data duration (e.g., a PDSCH duration or a PUSCH duration) and/or a rank associated with the single carrier waveform 918. In some examples, the receiving device 904 may receive an RRC configuration message 916 from the transmitting device 902 that indicates one or more characteristics of the single carrier waveform 918.

At 922, the receiving device 904 determines a DMRS pattern to apply based on the detected characteristic. For example, the receiving device 904 may use the table 914 to map the detected characteristic to a DMRS pattern. As described in connection with the DMRS pattern 812 of FIG. 8, the determined DMRS pattern may indicate a number of symbols that contain DMRS (e.g., the quantity indicator 812a), may indicate a starting time-domain resource element of DMRS for DMRS-containing symbols (e.g., the starting location indicator 812b), and/or may indicate a duration of DMRS for DMRS-containing symbols (e.g., the duration indicator 812c).

In an example second aspect 930, the transmitting device 902 may configure the receiving device 904 via control information. For example, the transmitting device 902 may configure the receiving device 904 with one or more DMRS pattern(s) 932. In some examples, the transmitting device 902 may transmit the one or more DMRS pattern(s) 932 that are received by the receiving device 904. The transmitting device 902 may transmit the one or more DMRS pattern(s) 932 via RRC signaling. The transmitting device 902 may then transmit control information 934 and a single carrier waveform 936 that is received by the receiving device 904. In some examples, the transmitting device 902 may transmit the control information 934 with the single carrier waveform 936. For example, the control information 934 may be associated with scheduled data (e.g., PDSCH or PUSCH) being transmitted via the single carrier waveform 936. The control information 934 may enable the transmitting device 902 to indicate the DMRS pattern to apply to the scheduled data. In such examples, the control information 934 may enable the transmitting device 902 to adjust the DMRS pattern dynamically. However, it may be appreciated that indicating the DMRS pattern via the control information 934 may increase overhead signaling between the transmitting device 902 and the receiving device 904 as the transmitting device 902 may include the indication of the DMRS pattern, for example, for each transmission to the receiving device 904.

In some examples, to reduce overhead, the transmitting device 902 may configure the receiving device 904 via an activation message, as described in an example third aspect 950 of FIG. 9. For example, the transmitting device 902 may configure the receiving device 904 with one or more DMRS pattern(s) 952. In some examples, the transmitting device 902 may transmit the one or more DMRS pattern(s) 952 that are received by the receiving device 904. The transmitting device 902 may transmit the one or more DMRS pattern(s) 952 via RRC signaling. The transmitting device 902 may then transmit an activation message 954 that is received by the receiving device 904. The transmitting device 902 may transmit the activation message 954 to the receiving device 904 via a MAC control element (MAC-CE). The activation message 954 may activate a subset of the one or more DMRS pattern(s) 952. The transmitting device 902 may then transmit control information 956 and a single carrier waveform 958 that is received by the receiving device 904. In some examples, the control information 956 may indicate one of the DMRS patterns of the subset of the one or more DMRS pattern(s) activated by the activation message 954. In some examples, the transmitting device 902 may forego transmitting the control information 956. In such examples, the receiving device 904 may select a DMRS pattern from the subset of one or more DMRS pattern(s) activated by the activation message 954.

Figure 10:
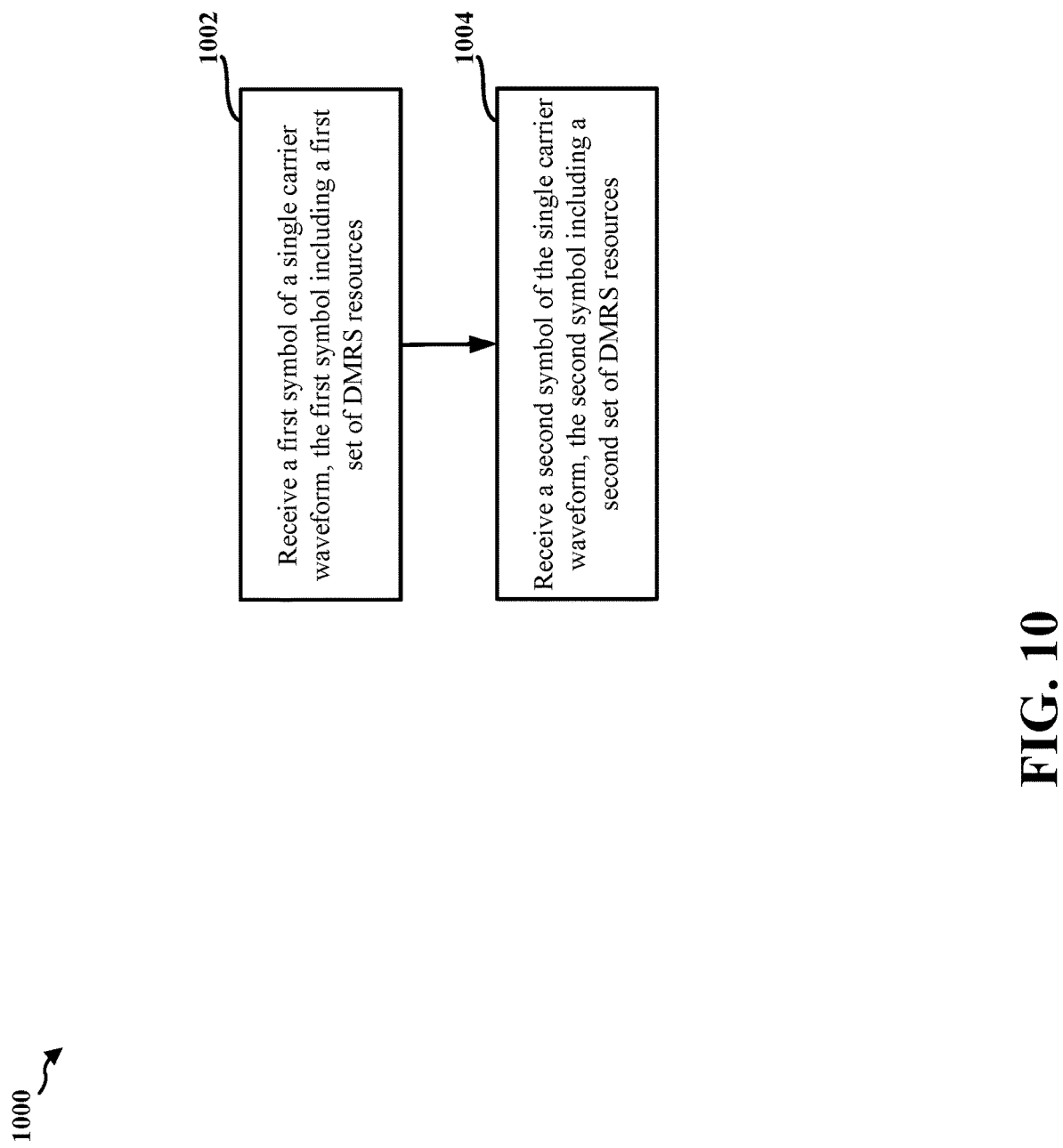
FIG. 10 is a flowchart of a method of wireless communication at a receiving device, in accordance with the teachings disclosed herein.

FIG. 10 is a flowchart 1000 of a method of wireless communication. The method may be performed by a receiving device (e.g., an apparatus 1202 of FIG. 12). In some examples, the wireless communication may include the receiving device receiving a downlink single carrier waveform. In such examples, the receiving device may be implemented by a UE (e.g., the UE 104 and/or the UE 350). In some examples, the wireless communication may include the receiving device receiving an uplink single carrier waveform. In such examples, the receiving device may be implemented by a base station (e.g., the base station 102/180 and/or the base station 310). The method may facilitate improving throughput, capacity, and/or spectral efficiency by enabling the receiving device to receive time-varying reference signals of a single carrier waveform.

At 1002, the receiving device receives a first symbol of a single carrier waveform, the first symbol including a first set of DMRS resources, as described in connection with the first symbol 824 of FIG. 8. For example, 1002 may be performed by a symbol reception component 1240 of the apparatus 1202 of FIG. 12. The first symbol may include time-varying DMRS, as described in connection with the examples of FIGS. 4A, 4B, 4C, 5, 6, and/or 7.

In some examples, the first set of DMRS resources and data within the first symbol are one of time-division multiplexed, code-division multiplexed, or space-division multiplexed, as described in connection with the examples of FIGS. 4A, 4B, 4C, 5, 6, and/or 7.

In some examples, the first symbol includes at least a CP, the first set of DMRS resources, and data, and the first set of DMRS resources are located after the CP in a time-domain and before the data in the time-domain, as described in connection with the example of FIG. 4A. In some examples, the first symbol includes at least a CP, the first set of DMRS resources, and data, and the data is located after the CP in a time-domain and before the first set of DMRS resources in the time-domain, as described in connection with the example of FIG. 4B. In some examples, the first symbol includes at least a CP, the first set of DMRS resources, a first data portion, and a second data portion, and the first set of DMRS resources are located between the first data portion and the second data portion in a time-domain, as described in connection with the example of FIG. 4C.

At 1004, the receiving device receives a second symbol of the single carrier waveform, the second symbol including a second set of DMRS resources associated with at least one of a DMRS starting location and a DMRS duration that is different than the first set of DMRS resources, as described in connection with the second symbol 826 of FIG. 8. For example, 1004 may be performed by the symbol reception component 1240 of the apparatus 1202 of FIG. 12. In some examples, the first symbol and the second symbol may be included in a same slot. In some examples, the first symbol and the second symbol may be included in different slots. The second symbol may include time-varying DMRS, as described in connection with the examples of FIGS. 4A, 4B, 4C, 5, 6, and/or 7.

In some examples, the first set of DMRS resources may be associated with a first DMRS starting location and the second set of DMRS resources may be associated with a second DMRS starting location that is different than the first DMRS starting location, as described in connection with the examples of FIGS. 4A, 4B, and/or 4C.

In some examples, the first set of DMRS resources and the second set of DMRS resources are associated with a same DMRS starting location, the first set of DMRS resources being associated with a first DMRS duration, and the second set of DMRS resources being associated with a second DMRS duration that is different than the first DMRS duration, as described in connection with the example of FIG. 5. In some examples, the second DMRS duration may occupy fewer time-domain resources than the first DMRS duration, as described in connection with the second duration 522 and the fifth duration 532 of FIG. 5.

In some examples, the first symbol includes at least a CP, the first set of DMRS resources, data, and PTRS resources, as described in connection with the example of FIGS. 6 and/or 7. In some such examples, the first set of DMRS resources and the PTRS resources may collide or may potentially collide.

Figure 11:
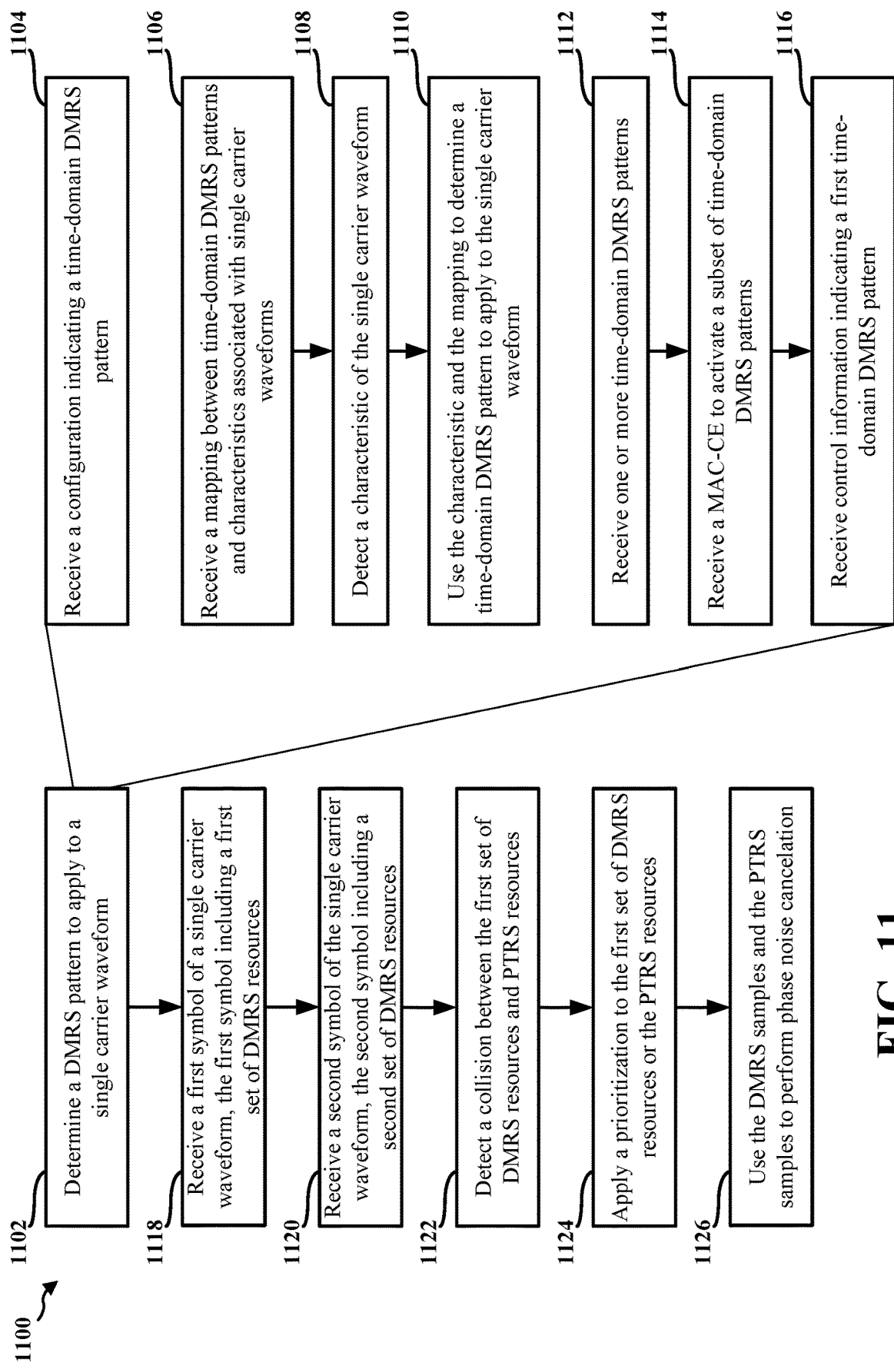
FIG. 11 is a flowchart of a method of wireless communication at a receiving device, in accordance with the teachings disclosed herein.

FIG. 11 is a flowchart 1100 of a method of wireless communication. The method may be performed by a receiving device (e.g., an apparatus 1202 of FIG. 12). In some examples, the wireless communication may include the receiving device receiving a downlink single carrier waveform. In such examples, the receiving device may be implemented by a UE (e.g., the UE 104 and/or the UE 350). In some examples, the wireless communication may include the receiving device receiving an uplink single carrier waveform. In such examples, the receiving device may be implemented by a base station (e.g., the base station 102/180 and/or the base station 310). The method may facilitate improving throughput, capacity, and/or spectral efficiency by enabling the receiving device to receive time-varying reference signals of a single carrier waveform.

At 1118, the receiving device receives a first symbol of a single carrier waveform, the first symbol including a first set of DMRS resources, as described in connection with the first symbol 824 of FIG. 8. For example, 1118 may be performed by a symbol reception component 1240 of the apparatus 1202 of FIG. 12. The first symbol may include time-varying DMRS, as described in connection with the examples of FIGS. 4A, 4B, 4C, 5, 6, and/or 7.

In some examples, the first set of DMRS resources and data within the first symbol are one of time-division multiplexed, code-division multiplexed, or space-division multiplexed, as described in connection with the examples of FIGS. 4A, 4B, 4C, 5, 6, and/or 7.

In some examples, the first symbol includes at least a CP, the first set of DMRS resources, and data, and the first set of DMRS resources are located after the CP in a time-domain and before the data in the time-domain, as described in connection with the example of FIG. 4A. In some examples, the first symbol includes at least a CP, the first set of DMRS resources, and data, and the data is located after the CP in a time-domain and before the first set of DMRS resources in the time-domain, as described in connection with the example of FIG. 4B. In some examples, the first symbol includes at least a CP, the first set of DMRS resources, a first data portion, and a second data portion, and the first set of DMRS resources are located between the first data portion and the second data portion in a time-domain, as described in connection with the example of FIG. 4C.

At 1120, the receiving device receives a second symbol of the single carrier waveform, the second symbol including a second set of DMRS resources associated with at least one of a DMRS starting location and a DMRS duration that is different than the first set of DMRS resources, as described in connection with the second symbol 826 of FIG. 8. For example, 1120 may be performed by the symbol reception component 1240 of the apparatus 1202 of FIG. 12. In some examples, the first symbol and the second symbol may be included in a same slot. In some examples, the first symbol and the second symbol may be included in different slots. The second symbol may include time-varying DMRS, as described in connection with the examples of FIGS. 4A, 4B, 4C, 5, 6, and/or 7.

In some examples, the first set of DMRS resources may be associated with a first DMRS starting location and the second set of DMRS resources may be associated with a second DMRS starting location that is different than the first DMRS starting location, as described in connection with the examples of FIGS. 4A, 4B, and/or 4C.

In some examples, the first set of DMRS resources and the second set of DMRS resources are associated with a same DMRS starting location, the first set of DMRS resources being associated with a first DMRS duration, and the second set of DMRS resources being associated with a second DMRS duration that is different than the first DMRS duration, as described in connection with the example of FIG. 5. In some examples, the second DMRS duration may occupy fewer time-domain resources than the first DMRS duration, as described in connection with the second duration 522 and the fifth duration 532 of FIG. 5.

In some examples, the first symbol includes at least a CP, the first set of DMRS resources, data, and PTRS resources, as described in connection with the example of FIGS. 6 and/or 7. In some such examples, the first set of DMRS resources and the PTRS resources may collide or may potentially collide. For example, at 1122, the receiving device may detect a collision between the first set of DMRS resources and the PTRS resources, as described in connection with 820 and/or 832 of FIG. 8. For example, 1122 may be performed by a collision component 1242 of the apparatus 1202 of FIG. 12.

At 1124, the receiving device may apply a prioritization to the first set of DMRS resources or the PTRS resources based on the collision, as described in connection with 822 and/or 834 of FIG. 8. For example, 1124 may be performed by a prioritization component 1244 of the apparatus 1202 of FIG. 12.

In some examples, the first set of DMRS resources may be derived using a first sequence and the PTRS resources may be derived using a second sequence that is different than the first sequence. The PTRS resources may be associated with a quantity of groups of PTRS resources and a group-size of PTRS resources per symbol.

In some examples, applying the prioritization includes the first set of DMRS resources puncturing the PTRS resources. For example, puncturing the PTRS resources may include discarding the PTRS resources at overlapping time-domain resource elements, as described in connection with the two samples of the first chunk 680 and the first sample 681*a* of FIG. 6. In some examples, puncturing the PTRS resources includes discarding the PTRS resources at a group of PTRS resources that overlaps with the first set of DMRS resources, as described in connection with the chunks 680-683 of FIG. 6. In some examples, applying the prioritization may include the PTRS resources puncturing the first set of DMRS resources, as described in connection with the samples of the first symbol DMRS portion 606 of FIG. 6.

In some examples, the first set of DMRS resources may be derived using a first sequence and the PTRS resources may be derived using a second sequence that is a same sequence as the first sequence. The PTRS resources may be associated with a quantity of groups of PTRS resources and a group-size of PTRS resources per symbol.

In some examples, applying the prioritization includes the first set of DMRS resources puncturing the PTRS resources. For example, puncturing the PTRS resources may include discarding the PTRS resources at a group of PTRS resources that overlaps with the first set of DMRS resources, as described in connection with the chunks 680-683 of FIG. 6. In some examples, applying the prioritization includes the PTRS resources puncturing the first set of DMRS resources, as described in connection with the samples of the first symbol DMRS portion 606 of FIG. 6. In some examples, the DMRS samples at a subset of the first set of DMRS resources and PTRS samples of the PTRS resources may be same samples, as described in connection with the resources subset 719 and/or the second resources subset 739 of FIG. 7.

At 1126, the receiving device may use the DMRS samples and the PTRS samples to perform phase noise compensation, as described in connection with 836 of FIG. 8. For example, 1126 may be performed by a phase noise component 1246 of the apparatus 1202 of FIG. 12.

In some examples, at 1102, the receiving device may determine a DMRS pattern to apply to a single carrier waveform, as described in connection with 830 of FIG. 8. For example, 1102 may be performed by a DMRS pattern component 1248 of the apparatus 1202 of FIG. 12.

In some examples, the receiving device may determine the DMRS pattern based on a configuration. For example, at 1104, the receiving device may receive a configuration indicating a time-domain DMRS pattern, as described in connection with the DMRS pattern 812 of FIG. 8. For example, 1104 may be performed by a configuration component 1250 of the apparatus 1202 of FIG. 12. The configuration may include an indicator of a quantity of DMRS-containing symbols, as described in connection with the quantity indicator 812a of FIG. 8. The configuration may include an indicator of a DMRS starting location for each DMRS-containing symbol, as described in connection with the starting location indicator 812b of FIG. 8. The configuration may include an indicator of a DMRS duration for each DMRS-containing symbol, as described in connection with the duration indicator 812c of FIG. 8. In some examples, the receiving device may receive the configuration via RRC signaling. In some examples, the receiving device may receive the configuration via a MAC-CE. In some examples, the receiving device may receive the configuration via control information.

In some examples, the receiving device may determine the DMRS pattern based on a mapping. For example, at 1106, the receiving device may receive a mapping between time-domain DMRS patterns and characteristics associated with single carrier waveforms, as described in connection with the DMRS mapping 912 and the table 914 of FIG. 9. For example, 1106 may be performed by a mapping component 1252 of the apparatus 1202 of FIG. 12. The characteristics may include one or more of a downlink data (PDSCH) duration, an uplink data (PUSCH) duration, and a rank.

At 1108, the receiving device may detect a characteristic of the single carrier waveform, as described in connection with 920 of FIG. 9. For example, 1108 may be performed by the mapping component 1252 of the apparatus 1202 of FIG. 12. For example, the receiving device may receive an RRC configuration for the single carrier waveform, as described in connection with the RRC configuration message 916 of FIG. 9. The RRC configuration may indicate one or more of a data duration (e.g., a PDSCH duration and/or a PUSCH duration) and a rank. In some examples, the receiving device may detect the characteristic of a received single carrier waveform. For example, the receiving device may determine a data duration (e.g., a PDSCH duration and/or a PUSCH duration) and/or a rank associated with a received single carrier waveform, as described in connection with the single carrier waveform 918 of FIG. 9.

At 1110, the receiving device may use the characteristic and the mapping to determine a time-domain DMRS pattern to apply to the single carrier waveform, as described in connection with 922 of FIG. 9. For example, 1110 may be performed by the mapping component 1252 of the apparatus 1202 of FIG. 12. For example, the receiving device may use the example table 914 of FIG. 9 to determine the time-domain DMRS pattern to apply based on the detected characteristic.

In some examples, the receiving device may determine the DMRS pattern to apply to a single carrier waveform based on control information indicating a first DMRS pattern of one or more DMRS patterns, as described in connection the example second aspect 930 of FIG. 9. For example, at 1112, the receiving device may receive one or more time-domain DMRS patterns, as described in connection with the example DMRS pattern(s) 932 of FIG. 9. For example, 1112 may be performed by the DMRS pattern component 1248 of the apparatus 1202 of FIG. 12. The receiving device may receive the one or more time-domain DMRS patterns via RRC signaling. At 1116, the receiving device may receive control information indicating a first time-domain DMRS pattern of the one or more time-domain DMRS patterns, as described in connection with the control information 934 of FIG. 9. For example, 1116 may be performed by an activation component 1254 of the apparatus 1202 of FIG. 12. In some examples, the control information may indicate the first time-domain DMRS pattern to use for a given scheduled data transmission. For example, the receiving device may receive the control information with the single carrier waveform, as described in connection with the control information 934 and the single carrier waveform 936 of FIG. 9.

In some examples, the receiving device may determine the DMRS pattern to apply to a single carrier waveform based at least in part on an activation message, as described in connection with the example third aspect 950 of FIG. 9. For example, at 1112, the receiving device may receive one or more time-domain DMRS patterns, as described in connection with the example DMRS pattern(s) 952 of FIG. 9. For example, 1112 may be performed by the DMRS pattern component 1248 of the apparatus 1202 of FIG. 12. The receiving device may receive the one or more time-domain DMRS patterns via RRC signaling. At 1114, the receiving device may receive a MAC-CE to activate a subset of time-domain DMRS patterns of the one or more time-domain DMRS patterns, as described in connection with the activation message 954 of FIG. 9. For example, 1114 may be performed by the activation component 1254 of the apparatus 1202 of FIG. 12. At 1116, the receiving device may receive control information indicating a first time-domain DMRS pattern of the subset of time-domain DMRS patterns, as described in connection with the control information 956 of FIG. 9. For example, 1116 may be performed by the activation component 1254 of the apparatus 1202 of FIG. 12. In some examples, the control information may indicate the first time-domain DMRS pattern to use for a given scheduled data transmission. For example, the receiving device may receive the control information with the single carrier waveform, as described in connection with the control information 956 and the single carrier waveform 958 of FIG. 9.

Figure 12:
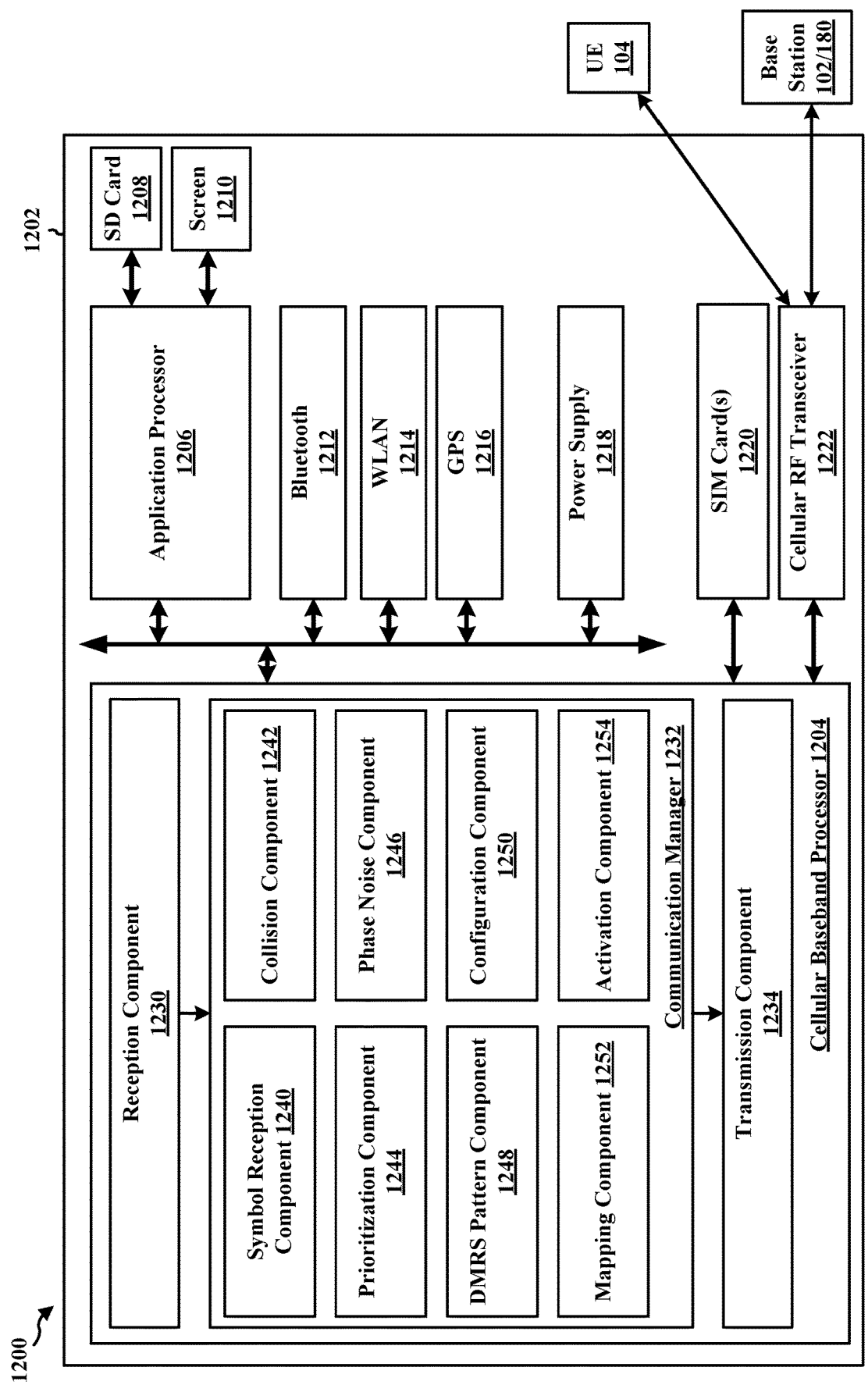
FIG. 12 is a diagram illustrating an example of a hardware implementation for an example apparatus, in accordance with the teachings disclosed herein.

FIG. 12 is a diagram 1200 illustrating an example of a hardware implementation for an apparatus 1202 that is configured to perform the aspects described in connection with FIGS. 10 and/or 11. The apparatus 1202 may be referred to as a receiving device, but may have the capability to transmit and receive. In some examples, the apparatus 1202 may be a UE. In other examples, the apparatus 1202 may be a base station. The apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or the base station 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. In one configuration, the cellular baseband processor 1204 may be a component of the UE 350 and may include the memory 360 and/or at least one of the TX processor 368, the RX processor 356, and the controller/processor 359. For example, the apparatus 1202 may be a modem chip and include just the cellular baseband processor 1204, and in another configuration, the apparatus 1202 may be the entire UE (e.g., see the UE 350 of FIG. 3) and include the additional modules of the apparatus 1202. In another configuration, the cellular baseband processor 1204 may be a component of the base station 310 and may include the memory 376 and/or at least one of the TX processor 316, the RX processor 370, and the controller/processor 375.

The communication manager 1232 includes a symbol reception component 1240 that is configured to receive a first symbol of a single carrier waveform, the first symbol including a first set of DMRS resources, for example, as described in connection with 1002 of FIG. 10 and/or 1118 of FIG. 11. The example symbol reception component 1240 may also be configured to receive a second symbol of the single carrier waveform, the second symbol including a second set of DMRS resources, for example, as described in connection with 1004 of FIG. 10 and/or 1120 of FIG. 11.

The communication manager 1232 also includes a collision component 1242 that is configured to detect a collision between the first set of DMRS resources and PTRS resources, for example, as described in connection with 1122 of FIG. 11.

The communication manager 1232 also includes a prioritization component 1244 that is configured to apply a prioritization to the first set of DMRS resources or the PTRS resources, for example, as described in connection with 1124 of FIG. 11.

The communication manager 1232 also includes a phase noise component 1246 that is configured to use the DMRS samples and the PTRS samples to perform phase noise cancelation, for example, as described in connection with 1126 of FIG. 11.

The communication manager 1232 also includes a DMRS pattern component 1248 that is configured to determine a DMRS pattern to apply to a single carrier waveform, for example, as described in connection with 1102 of FIG. 11. The example DMRS pattern component 1248 may also be configured to receive one or more time-domain DMRS patterns, for example, as described in connection with 1112 of FIG. 11.

The communication manager 1232 also includes a configuration component 1250 that is configured to receive a configuration indicating a time-domain DMRS pattern, for example, as described in connection with 1104 of FIG. 11.

The communication manager 1232 also includes a mapping component 1252 that is configured to receive a mapping between time-domain DMRS patterns and characteristics associated with single carrier waveforms, for example, as described in connection with 1106 of FIG. 11. The example mapping component 1252 may also be configured to detect a characteristic of the single carrier waveform, for example, as described in connection with 1108 of FIG. 11. The example mapping component 1252 may also be configured to use the characteristic and the mapping to determine a time-domain DMRS pattern to apply to the single carrier waveform, for example, as described in connection with 1110 of FIG. 11.

The communication manager 1232 also includes an activation component 1254 that is configured to receive a MAC-CE to activate a subset of time-domain DMRS patterns, for example, as described in connection with 1114 of FIG. 11. The example activation component 1254 may also be configured to receive control information indicating a first time-domain DMRS pattern, for example, as described in connection with 1116 of FIG. 11.

The apparatus may include additional components that perform each of the blocks of the algorithm in the flowcharts of FIGS. 10 and/or 11. As such, each block in the flowcharts of FIGS. 10 and/or 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving a first symbol of a single carrier waveform, the first symbol including a first set of DMRS resources. The example apparatus 1202 also includes means for receiving a second symbol of the single carrier waveform, the second symbol including a second set of DMRS resources, the second set of DMRS resources associated with at least one of a DMRS starting location and a DMRS duration that is different than the first set of DMRS resources.

In another configuration, the example apparatus 1202 also includes means for detecting a collision between the first set of DMRS resources and the PTRS resources. The example apparatus 1202 also includes means for applying a prioritization to the first set of DMRS resources or the PTRS resources based on the collision.

In another configuration, the example apparatus 1202 also includes means for the first set of DMRS resources puncturing the PTRS resources including discarding the PTRS resources at overlapping time-domain resource elements.

In another configuration, the example apparatus 1202 also includes means for the first set of DMRS resources puncturing the PTRS resources including discarding the PTRS resources at a group of PTRS resources that overlaps with the first set of DMRS resources, the PTRS resources being associated with a quantity of groups of PTRS resources and a group-size of PTRS resources per symbol.

In another configuration, the example apparatus 1202 also includes means for the PTRS resources puncturing the first set of DMRS resources.

In another configuration, the example apparatus 1202 also includes means for the first set of DMRS resources puncturing the PTRS resources.

In another configuration, the example apparatus 1202 also includes means for discarding the PTRS resources at a group of PTRS resources that overlaps with the first set of DMRS resources, the PTRS resources being associated with a quantity of groups of PTRS resources and a group-size of PTRS resources per symbol.

In another configuration, the example apparatus 1202 also includes means for the PTRS resources puncturing the first set of DMRS resources.

In another configuration, the example apparatus 1202 also includes means for using the DMRS samples and the PTRS samples to perform phase noise compensation.

In another configuration, the example apparatus 1202 also includes means for receiving a configuration indicating a time-domain DMRS pattern, wherein the configuration includes one or more of: an indicator of a quantity of DMRS-containing symbols, an indicator of a DMRS starting location for each DMRS-containing symbol, and an indicator of a DMRS duration for each DMRS-containing symbol.

In another configuration, the example apparatus 1202 also includes means for receiving the configuration via RRC signaling, a MAC-CE, or control information.

In another configuration, the example apparatus 1202 also includes means for receiving a mapping between time-domain DMRS patterns and characteristics associated with single carrier waveforms.

In another configuration, the example apparatus 1202 also includes means for detecting a characteristic of the single carrier waveform. The example apparatus 1202 also includes means for using the characteristic and the mapping to determine a time-domain DMRS pattern to apply to the single carrier waveform.

In another configuration, the example apparatus 1202 also includes means for receiving, via RRC signaling, one or more time-domain DMRS patterns. The example apparatus 1202 also includes means for receiving control information with the single carrier waveform indicating a first time-domain DMRS pattern of the one or more time-domain DMRS patterns.

In another configuration, the example apparatus 1202 also includes means for receiving, via RRC signaling, one or more time-domain DMRS patterns. The example apparatus 1202 also includes means for receiving a MAC-CE to activate a subset of time-domain DMRS patterns of the one or more time-domain DMRS patterns. The example apparatus 1202 also includes means for receiving control information indicating a first time-domain DMRS pattern of the subset of time-domain DMRS patterns.

The means may be one or more of the components of the apparatus 1202 configured to perform the functions recited by the means. As described supra, in one configuration, the apparatus 1202 may include the TX processor 368, the RX processor 356, and the controller/processor 359. As such, in one configuration, the means may be the TX processor 368, the RX processor 356, and the controller/processor 359 configured to perform the functions recited by the means. In another configuration, the apparatus 1202 may include the TX processor 316, the RX processor 370, and the controller/processor 375. As such, in one configuration, the means may be the TX processor 316, the RX processor 370, and the controller/processor 375 configured to perform the functions recited by the means.

Figure 13:
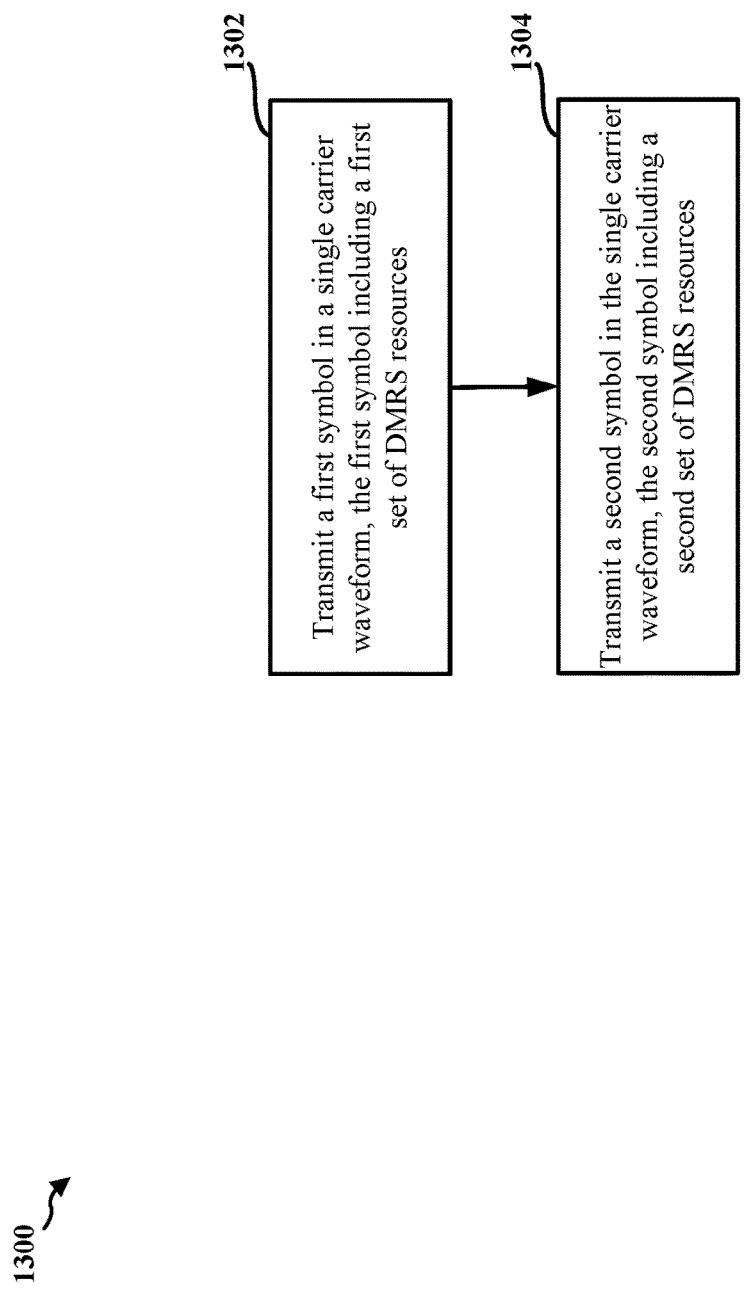
FIG. 13 is a flowchart of a method of wireless communication at a transmitting device, in accordance with the teachings disclosed herein.

FIG. 13 is a flowchart 1300 of a method of wireless communication. The method may be performed by a transmitting device (e.g., an apparatus 1502 of FIG. 15). In some examples, the wireless communication may include the transmitting device transmitting a downlink single carrier waveform. In such examples, the transmitting device may be implemented by a base station (e.g., the base station 102/180 and/or the base station 310). In some examples, the wireless communication may include the transmitting device transmitting an uplink single carrier waveform. In such examples, the transmitting device may be implemented by a UE (e.g., the UE 104 and/or the UE 350). The method may facilitate improving throughput, capacity, and/or spectral efficiency by enabling the transmitting device to transmitting time-varying reference signals of a single carrier waveform.

At 1302, the transmitting device transmits a first symbol in a single carrier waveform, the first symbol including a first set of DMRS resources, as described in connection with the first symbol 824 of FIG. 8. For example, 1302 may be performed by a symbol transmission component 1540 of the apparatus 1502 of FIG. 15. The first symbol may include time-varying DMRS, as described in connection with the examples of FIGS. 4A, 4B, 4C, 5, 6, and/or 7.

In some examples, the first set of DMRS resources and data within the first symbol are one of time-division multiplexed, code-division multiplexed, or space-division multiplexed, as described in connection with the examples of FIGS. 4A, 4B, 4C, 5, 6, and/or 7.

In some examples, the first symbol includes at least a CP, the first set of DMRS resources, and data, and the first set of DMRS resources are located after the CP in a time-domain and before the data in the time-domain, as described in connection with the example of FIG. 4A. In some examples, the first symbol includes at least a CP, the first set of DMRS resources, and data, and the data is located after the CP in a time-domain and before the first set of DMRS resources in the time-domain, as described in connection with the example of FIG. 4B. In some examples, the first symbol includes at least a CP, the first set of DMRS resources, a first data portion, and a second data portion, and the first set of DMRS resources are located between the first data portion and the second data portion in a time-domain, as described in connection with the example of FIG. 4C.

At 1304, the transmitting device transmits a second symbol of the single carrier waveform, the second symbol including a second set of DMRS resources associated with at least one of a DMRS starting location and a DMRS duration that is different than the first set of DMRS resources, as described in connection with the second symbol 826 of FIG. 8. For example, 1304 may be performed by the symbol transmission component 1540 of the apparatus 1502 of FIG. 15. In some examples, the first symbol and the second symbol may be included in a same slot. In some examples, the first symbol and the second symbol may be included in different slots. The second symbol may include time-varying DMRS, as described in connection with the examples of FIGS. 4A, 4B, 4C, 5, 6, and/or 7.

In some examples, the first set of DMRS resources may be associated with a first DMRS starting location and the second set of DMRS resources may be associated with a second DMRS starting location that is different than the first DMRS starting location, as described in connection with the examples of FIGS. 4A, 4B, and/or 4C.

In some examples, the first set of DMRS resources and the second set of DMRS resources are associated with a same DMRS starting location, the first set of DMRS resources being associated with a first DMRS duration, and the second set of DMRS resources being associated with a second DMRS duration that is different than the first DMRS duration, as described in connection with the example of FIG. 5. In some examples, the second DMRS duration may occupy fewer time-domain resources than the first DMRS duration, as described in connection with the second duration 522 and the fifth duration 532 of FIG. 5.

In some examples, the first symbol includes at least a CP, the first set of DMRS resources, data, and PTRS resources, as described in connection with the example of FIGS. 6 and/or 7. In some such examples, the first set of DMRS resources and the PTRS resources may collide or may potentially collide.

In some examples, the first set of DMRS resources may be derived using a first sequence and the PTRS resources may be derived using a second sequence that is different than the first sequence. The PTRS resources may be associated with a quantity of groups of PTRS resources and a group-size of PTRS resources per symbol.

In some examples, the first set of DMRS resources may be derived using a first sequence and the PTRS resources may be derived using a second sequence that is a same sequence as the first sequence. In some examples, the DMRS samples at a subset of the first set of DMRS resources and PTRS samples of the PTRS resources may be same samples, as described in connection with the resources subset 719 and/or the second resources subset 739 of FIG. 7.

Figure 14:
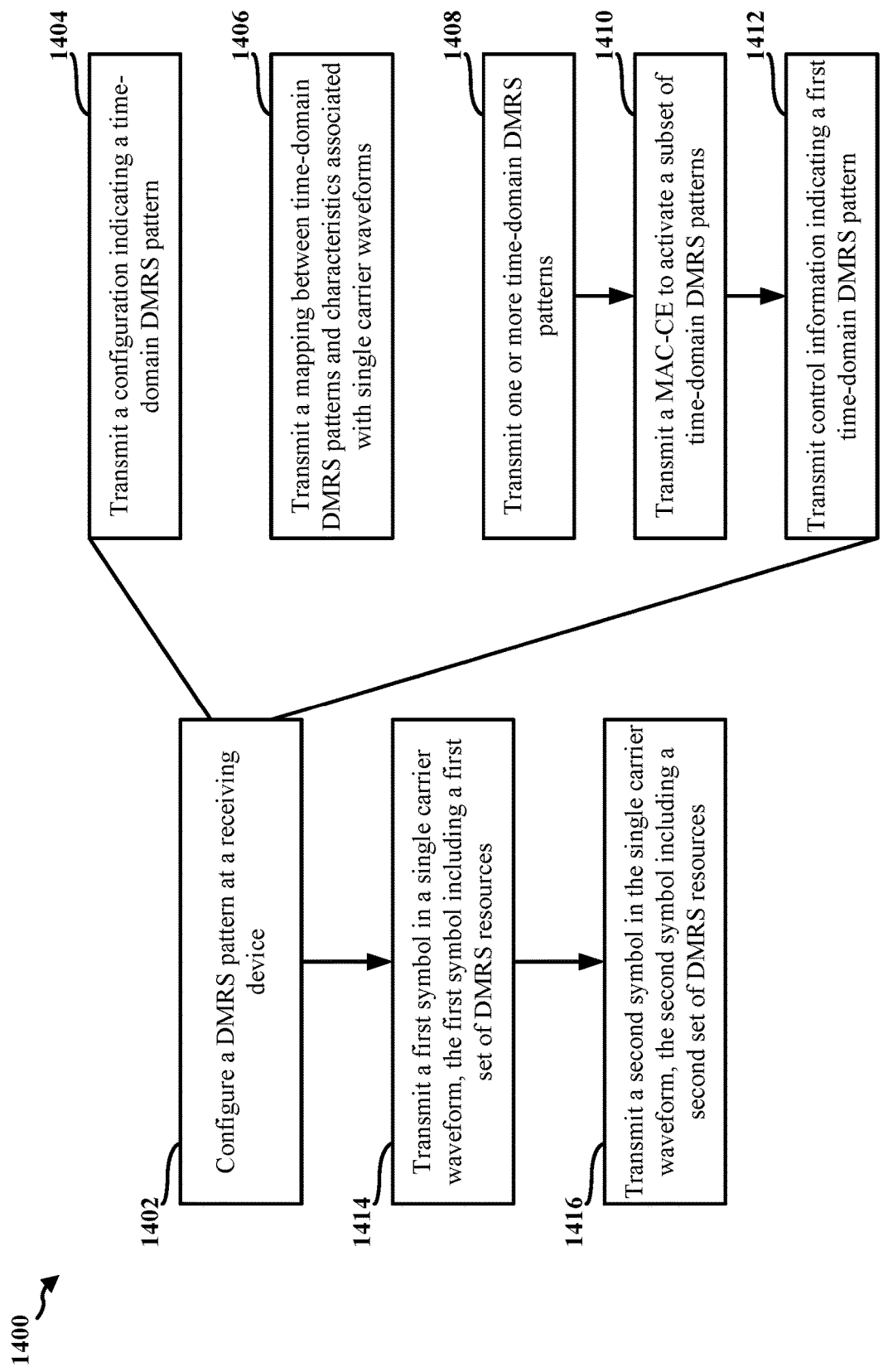
FIG. 14 is a flowchart of a method of wireless communication at a transmitting device, in accordance with the teachings disclosed herein.

FIG. 14 is a flowchart 1400 of a method of wireless communication. The method may be performed by a transmitting device (e.g., an apparatus 1502 of FIG. 15). In some examples, the wireless communication may include the transmitting device transmitting a downlink single carrier waveform. In such examples, the transmitting device may be implemented by a base station (e.g., the base station 102/180 and/or the base station 310). In some examples, the wireless communication may include the transmitting device transmitting an uplink single carrier waveform. In such examples, the transmitting device may be implemented by a UE (e.g., the UE 104 and/or the UE 350). The method may facilitate improving throughput, capacity, and/or spectral efficiency by enabling the transmitting device to transmitting time-varying reference signals of a single carrier waveform.

At 1414, the transmitting device transmits a first symbol in a single carrier waveform, the first symbol including a first set of DMRS resources, as described in connection with the first symbol 824 of FIG. 8. For example, 1414 may be performed by a symbol transmission component 1540 of the apparatus 1502 of FIG. 15. The first symbol may include time-varying DMRS, as described in connection with the examples of FIGS. 4A, 4B, 4C, 5, 6, and/or 7.

In some examples, the first set of DMRS resources and data within the first symbol are one of time-division multiplexed, code-division multiplexed, or space-division multiplexed, as described in connection with the examples of FIGS. 4A, 4B, 4C, 5, 6, and/or 7.

In some examples, the first symbol includes at least a CP, the first set of DMRS resources, and data, and the first set of DMRS resources are located after the CP in a time-domain and before the data in the time-domain, as described in connection with the example of FIG. 4A. In some examples, the first symbol includes at least a CP, the first set of DMRS resources, and data, and the data is located after the CP in a time-domain and before the first set of DMRS resources in the time-domain, as described in connection with the example of FIG. 4B. In some examples, the first symbol includes at least a CP, the first set of DMRS resources, a first data portion, and a second data portion, and the first set of DMRS resources are located between the first data portion and the second data portion in a time-domain, as described in connection with the example of FIG. 4C.

At 1416, the transmitting device transmits a second symbol of the single carrier waveform, the second symbol including a second set of DMRS resources associated with at least one of a DMRS starting location and a DMRS duration that is different than the first set of DMRS resources, as described in connection with the second symbol 826 of FIG. 8. For example, 1416 may be performed by the symbol transmission component 1540 of the apparatus 1502 of FIG. 15. In some examples, the first symbol and the second symbol may be included in a same slot. In some examples, the first symbol and the second symbol may be included in different slots. The second symbol may include time-varying DMRS, as described in connection with the examples of FIGS. 4A, 4B, 4C, 5, 6, and/or 7.

In some examples, the first set of DMRS resources may be associated with a first DMRS starting location and the second set of DMRS resources may be associated with a second DMRS starting location that is different than the first DMRS starting location, as described in connection with the examples of FIGS. 4A, 4B, and/or 4C.

In some examples, the first set of DMRS resources and the second set of DMRS resources are associated with a same DMRS starting location, the first set of DMRS resources being associated with a first DMRS duration, and the second set of DMRS resources being associated with a second DMRS duration that is different than the first DMRS duration, as described in connection with the example of FIG. 5. In some examples, the second DMRS duration may occupy fewer time-domain resources than the first DMRS duration, as described in connection with the second duration 522 and the fifth duration 532 of FIG. 5.

In some examples, the first symbol includes at least a CP, the first set of DMRS resources, data, and PTRS resources, as described in connection with the example of FIGS. 6 and/or 7. In some such examples, the first set of DMRS resources and the PTRS resources may collide or may potentially collide.

In some examples, the first set of DMRS resources may be derived using a first sequence and the PTRS resources may be derived using a second sequence that is different than the first sequence. The PTRS resources may be associated with a quantity of groups of PTRS resources and a group-size of PTRS resources per symbol.

In some examples, the first set of DMRS resources may be derived using a first sequence and the PTRS resources may be derived using a second sequence that is a same sequence as the first sequence. In some examples, the DMRS samples at a subset of the first set of DMRS resources and PTRS samples of the PTRS resources may be same samples, as described in connection with the resources subset 719 and/or the second resources subset 739 of FIG. 7.

At 1402, the transmitting device may configure a DMRS pattern at the receiving device, as described in connection with 810 of FIG. 8. For example, 1402 may be performed by a DMRS pattern component 1542 of the apparatus 1502 of FIG. 15.

In some examples, the transmitting device may configure the DMRS pattern at the receiving device based on a configuration. For example, at 1404, the transmitting device may transmit a configuration indicating a time-domain DMRS pattern, as described in connection with the DMRS pattern 812 of FIG. 8. For example, 1404 may be performed by a configuration component 1544 of the apparatus 1502 of FIG. 15.

The configuration may include an indicator of a quantity of DMRS-containing symbols, as described in connection with the quantity indicator 812*a* of FIG. 8. The configuration may include an indicator of a DMRS starting location for each DMRS-containing symbol, as described in connection with the starting location indicator 812*b* of FIG. 8. The configuration may include an indicator of a DMRS duration for each DMRS-containing symbol, as described in connection with the duration indicator 812*c* of FIG. 8. In some examples, the receiving device may receive the configuration via RRC signaling. In some examples, the receiving device may receive the configuration via a MAC-CE. In some examples, the receiving device may receive the configuration via control information.

In some examples, the transmitting device may configure the DMRS pattern at the receiving device based on a mapping. For example, at 1406, the transmitting device may transmit a mapping between time-domain DMRS patterns and characteristics associated with single carrier waveforms, as described in connection with the DMRS mapping 912 and the table 914 of FIG. 9. For example, 1406 may be performed by a mapping component 1546 of the apparatus 1502 of FIG. 15. The characteristics may include one or more of a downlink data (PDSCH) duration, an uplink data (PUSCH) duration, and a rank.

In some examples, the transmitting device may configure the DMRS pattern at the receiving device based on control information indicating a first DMRS pattern of one or more DMRS patterns, as described in connection the example second aspect 930 of FIG. 9. For example, at 1408, the transmitting device may transmit one or more time-domain DMRS patterns, as described in connection with the example DMRS pattern(s) 932 of FIG. 9. For example, 1408 may be performed by the DMRS pattern component 1542 of the apparatus 1502 of FIG. 15. The transmitting device may transmit the one or more time-domain DMRS patterns via RRC signaling. At 1412, the transmitting device may transmit control information indicating a first time-domain DMRS pattern of the one or more time-domain DMRS patterns, as described in connection with the control information 934 of FIG. 9. For example, 1412 may be performed by an activation component 1548 of the apparatus 1502 of FIG. 15. In some examples, the control information may indicate the first time-domain DMRS pattern to use for a given scheduled data transmission. For example, the transmitting device may transmit the control information with the single carrier waveform, as described in connection with the control information 934 and the single carrier waveform 936 of FIG. 9.

In some examples, the transmitting device may configure the DMRS pattern at the receiving device based at least in part on an activation message, as described in connection with the example third aspect 950 of FIG. 9. For example, at 1408, the transmitting device may transmit one or more time-domain DMRS patterns, as described in connection with the example DMRS pattern(s) 932 of FIG. 9. For example, 1408 may be performed by the DMRS pattern component 1542 of the apparatus 1502 of FIG. 15. The transmitting device may transmit the one or more time-domain DMRS patterns via RRC signaling. At 1410, the transmitting device may transmit a MAC-CE to activate a subset of time-domain DMRS patterns of the one or more time-domain DMRS patterns, as described in connection with the activation message 954 of FIG. 9. For example, 1410 may be performed by the activation component 1548 of the apparatus 1502 of FIG. 15. At 1412, the transmitting device may transmit control information indicating a first time-domain DMRS pattern of the subset of time-domain DMRS patterns, as described in connection with the control information 956 of FIG. 9. For example, 1412 may be performed by the activation component 1548 of the apparatus 1502 of FIG. 15. In some examples, the control information may indicate the first time-domain DMRS pattern to use for a given scheduled data transmission. For example, the transmitting device may transmit the control information with the single carrier waveform, as described in connection with the control information 956 and the single carrier waveform 958 of FIG. 9.

Figure 15:
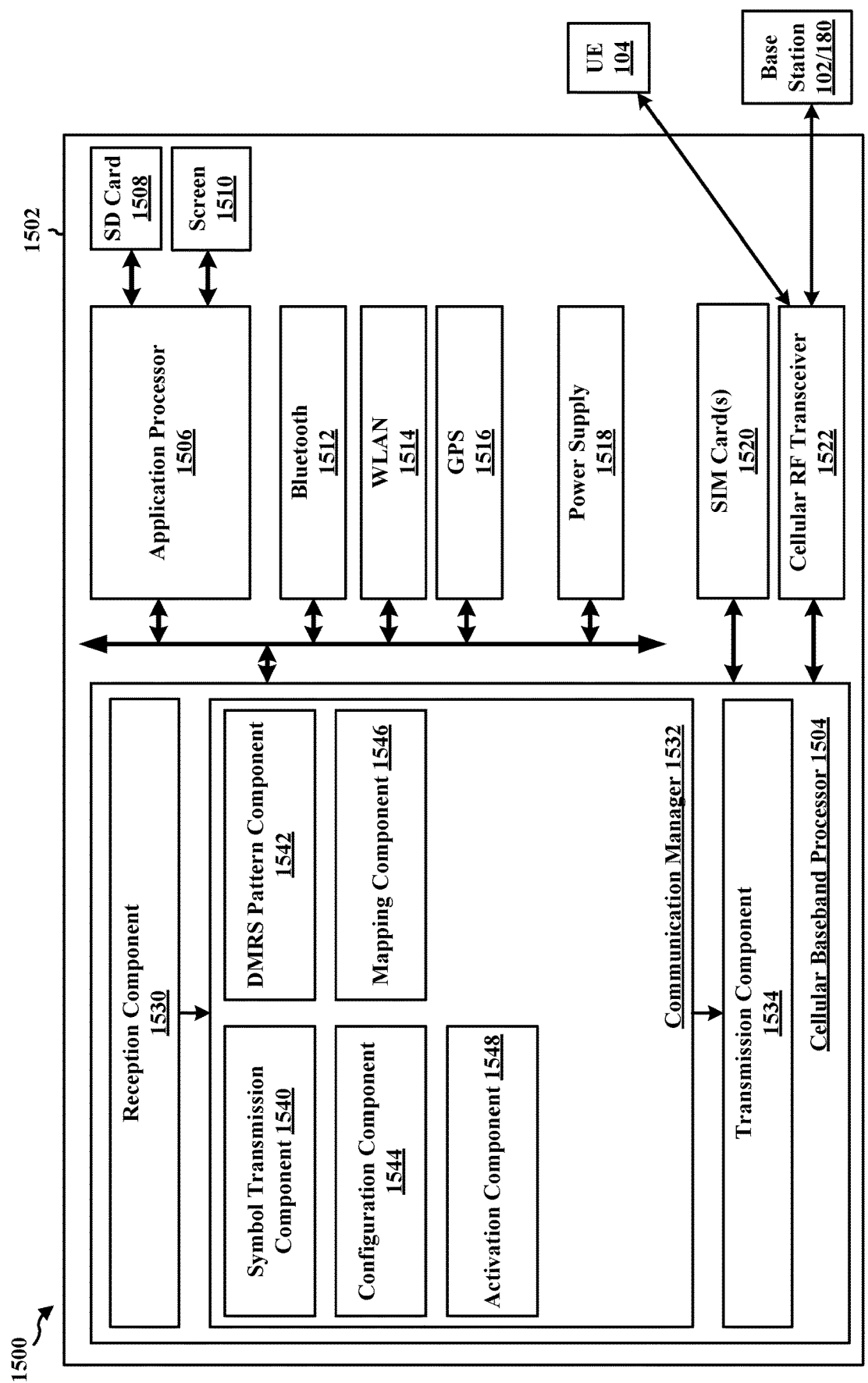
FIG. 15 is a diagram illustrating an example of a hardware implementation for an example apparatus, in accordance with the teachings disclosed herein.

FIG. 15 is a diagram 1500 illustrating an example of a hardware implementation for an apparatus 1502 that is configured to perform the aspects described in connection with FIGS. 13 and/or 14. The apparatus 1502 may be referred to as a transmitting device, but may have the capability to transmit and receive. In some examples, the apparatus 1502 may be a UE. In other examples, the apparatus 1502 may be a base station. The apparatus 1202 may include a cellular baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1504 communicates through the cellular RF transceiver 1522 with the UE 104 and/or the base station 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532 and a transmission component 1534. The communication manager 1532 includes the one or more illustrated components. The components within the communication manager 1532 may be stored in the computer-readable medium/memory and/or configured as hardware within the cellular baseband processor 1504. In one configuration, the cellular baseband processor 1504 may be a component of the UE 350 and may include the memory 360 and/or at least one of the TX processor 368, the RX processor 356, and the controller/processor 359. For example, the apparatus 1502 may be a modem chip and include just the cellular baseband processor

1504, and in another configuration, the apparatus 1502 may be the entire UE (e.g., see the UE 350 of FIG. 3) and include the additional modules of the apparatus 1502. In another configuration, the cellular baseband processor 1504 may be a component of the base station 310 and may include the memory 376 and/or at least one of the TX processor 316, the RX processor 370, and the controller/processor 375.

The communication manager 1532 includes a symbol transmission component 1540 that is configured to transmit a first symbol in a single carrier waveform, the first symbol including a first set of DMRS resources, for example, as described in connection with 1302 of FIG. 13 and/or 1414 of FIG. 14. The example symbol transmission component 1540 may also be configured to transmit a second symbol in the single carrier waveform, the second symbol including a second set of DMRS resources, the second set of DMRS resources associated with at least one of a DMRS starting location and a DMRS duration that is different than the first set of DMRS resources, for example, as described in connection with 1304 of FIG. 13 and/or 1416 of FIG. 14.

The communication manager 1532 also includes a DMRS pattern component 1542 that is configured to configure a DMRS pattern at a receiving device, for example, as described in connection with 1402 of FIG. 14. The example DMRS pattern component 1542 may also be configured to transmit, via RRC signaling, one or more time-domain DMRS patterns, for example, as described in connection with 1408 of FIG. 14.

The communication manager 1532 also includes a configuration component 1544 that is configured to transmit a configuration indicating a time-domain DMRS pattern, for example, as described in connection with 1404 of FIG. 14.

The communication manager 1532 also includes a mapping component 1546 that is configured to transmit a mapping between time-domain DMRS patterns and characteristics associated with single carrier waveforms, for example, as described in connection with 1406 of FIG. 14.

The communication manager 1532 also includes an activation component 1548 that is configured to transmit a MAC-CE to activate a subset of time-domain DMRS patterns of the one or more time-domain DMRS patterns, for example, as described in connection with 1410 of FIG. 14. The example activation component 1548 may also be configured to transmit control information indicating a first time-domain DMRS pattern, for example, as described in connection with 1412 of FIG. 14.

The apparatus may include additional components that perform each of the blocks of the algorithm in the flowcharts of FIGS. 13 and/or 14. As such, each block in the flowcharts of FIGS. 13 and/or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for transmitting a first symbol in a single carrier waveform, the first symbol including a first set of DMRS resources. The example apparatus 1502 also includes means for transmitting a second symbol in the single carrier waveform, the second symbol including a second set of DMRS resources, the second set of DMRS resources associated with at least one of a DMRS starting location and a DMRS duration that is different than the first set of DMRS resources.

In another configuration, the example apparatus 1502 also includes means for transmitting a configuration indicating a time-domain DMRS pattern, wherein the configuration includes one or more of: an indicator of a quantity of DMRS-containing symbols, an indicator of a DMRS starting location for each DMRS-containing symbol, and an indicator of a DMRS duration for each DMRS-containing symbol.

In another configuration, the example apparatus 1502 also includes means for transmitting the configuration via RRC signaling, a MAC-CE, or control information.

In another configuration, the example apparatus 1502 also includes means for transmitting a mapping between time-domain DMRS patterns and characteristics associated with single carrier waveforms.

In another configuration, the example apparatus 1502 also includes means for transmitting, via RRC signaling, one or more time-domain DMRS patterns. The example apparatus 1502 also includes means for transmitting control information with the single carrier waveform indicating a first time-domain DMRS pattern of the one or more time-domain DMRS patterns.

In another configuration, the example apparatus 1502 also includes means for transmitting, via RRC signaling, one or more time-domain DMRS patterns. The example apparatus 1502 also includes means for transmitting a MAC-CE to activate a subset of time-domain DMRS patterns of the one or more time-domain DMRS patterns. The example apparatus 1502 also includes means for transmitting control information indicating a first time-domain DMRS pattern of the subset of time-domain DMRS patterns.

The means may be one or more of the components of the apparatus 1502 configured to perform the functions recited by the means. As described supra, in one configuration, the apparatus 1502 may include the TX processor 368, the RX processor 356, and the controller/processor 359. As such, in one configuration, the means may be the TX processor 368, the RX processor 356, and the controller/processor 359 configured to perform the functions recited by the means. In another configuration, the apparatus 1502 may include the TX processor 316, the RX processor 370, and the controller/processor 375. As such, in one configuration, the means may be the TX processor 316, the RX processor 370, and the controller/processor 375 configured to perform the functions recited by the means.

Aspects disclosed herein provide techniques for facilitating intra-symbol multiplexing between DMRS and other signals of an SC waveform. For example, disclosed technique utilizes a time-domain DMRS pattern that indicates a starting location and a duration of the DMRS of a symbol. The time-domain DMRS pattern may enable a network to control overhead, for example, with respect to the DMRS. The time-domain DMRS pattern may additionally or alternatively enable the network to apply an applicable configuration based on a target use case. For example, if channel conditions are good, then the network may utilize a time-domain DMRS pattern in which resources allocated to DMRS are reduced compared to scenarios in which channel conditions are poor or less than good. In some examples, the time-domain DMRS pattern may facilitate allocating less than all of the resources of a symbol to DMRS (e.g., the DMRS may be allocated to a portion of the resources of the symbol). In some examples, based on the time-domain DMRS pattern, the DMRS may be repeated across symbols.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive a first symbol of a single carrier waveform, the first symbol including a first set of DMRS resources; and receive a second symbol of the single carrier waveform, the second symbol including a second set of DMRS resources, the second set of DMRS resources associated with at least one of a DMRS starting location and a DMRS duration that is different than the first set of DMRS resources.

Aspect 2 is the apparatus of aspect 1, further including that the first set of DMRS resources and data within the first symbol are one of time-division multiplexed, code-division multiplexed, or space-division multiplexed.

Aspect 3 is the apparatus of any of aspects 1 and 2, further including that the first set of DMRS resources are associated with a first DMRS starting location and the second set of DMRS resources are associated with a second DMRS starting location that is different than the first DMRS starting location.

Aspect 4 is the apparatus of any of aspects 1 to 3, further including that the first symbol includes at least a CP, the first set of DMRS resources, and data, and the first set of DMRS resources are located after the CP in a time-domain and before the data in the time-domain.

Aspect 5 is the apparatus of any of aspects 1 to 3, further including that the first symbol includes at least a CP, the first set of DMRS resources, and data, and the data is located after the CP in a time-domain and before the first set of DMRS resources in the time-domain.

Aspect 6 is the apparatus of any of aspects 1 and 2, further including that the first set of DMRS resources and the second set of DMRS resources are associated with a same DMRS starting location, the first set of DMRS resources are associated with a first DMRS duration, and the second set of DMRS resources are associated with a second DMRS duration that is different than the first DMRS duration.

Aspect 7 is the apparatus of any of aspects 1, 2, and 6, further including that the second DMRS duration occupies fewer time-domain resources than the first DMRS duration.

Aspect 8 is the apparatus of any of aspects 1 to 7, further including that the first symbol includes at least a CP, the first set of DMRS resources, data, and PTRS resources.

Aspect 9 is the apparatus of any of aspects 1 to 8, further including that the memory and the at least one processor are further configured to: detect a collision between the first set of DMRS resources and the PTRS resources; and apply a prioritization to the first set of DMRS resources or the PTRS resources based on the collision.

Aspect 10 is the apparatus of any of aspects 1 to 9, further including that the first set of DMRS resources are derived using a first sequence and the PTRS resources are derived using a second sequence that is different than the first sequence.

Aspect 11 is the apparatus of any of aspects 1 to 10, further including that the first set of DMRS resources are prioritized, and to puncture the PTRS resources, the memory and the at least one processor are further configured to: discard the PTRS resources at overlapping time-domain resource elements.

Aspect 12 is the apparatus of any of aspects 1 to 10, further including that the first set of DMRS resources are prioritized, and to puncture the PTRS resources, the memory and the at least one processor are further configured to: discard the PTRS resources at a group of PTRS resources that overlaps with the first set of DMRS resources, the PTRS resources being associated with a quantity of groups of PTRS resources and a group-size of PTRS resources per symbol.

Aspect 13 is the apparatus of any of aspects 1 to 10, further including that to apply the prioritization, the memory and the at least one processor are further configured to: puncture the first set of DMRS resources.

Aspect 14 is the apparatus of any of aspects 1 to 9, further including that the first set of DMRS resources are derived using a first sequence and the PTRS resources are derived using a second sequence that is a same sequence as the first sequence.

Aspect 15 is the apparatus of any of aspects 1 to 9, and 14, further including that to apply the prioritization, the memory and the at least one processor are further configured: to puncture the PTRS resources.

Aspect 16 is the apparatus of any of aspects 1 to 9, 14, and 15, further including that to puncture the PTRS resources, the memory and the at least one processor are further configured to: discard the PTRS resources at a group of PTRS resources that overlaps with the first set of DMRS resources, the PTRS resources being associated with a quantity of groups of PTRS resources and a group-size of PTRS resources per symbol.

Aspect 17 is the apparatus of any of aspects 1 to 9, and 14, further including that to apply the prioritization, the memory and the at least one processor are further configured to: puncture the first set of DMRS resources.

Aspect 18 is the apparatus of any of aspects 1 to 9, and 14, further including that DMRS samples at a subset of the first set of DMRS resources and PTRS samples of the PTRS resources are same samples.

Aspect 19 is the apparatus of any of aspects 1 to 9, 14, and 18, further including that the memory and the at least one processor are further configured to: use the DMRS samples and the PTRS samples to perform phase noise compensation.

Aspect 20 is the apparatus of any of aspects 1 to 19, further including that the first symbol and the second symbol are included in a same slot.

Aspect 21 is the apparatus of any of aspects 1 to 20, further including that the first symbol and the second symbol are included in different slot.

Aspect 22 is the apparatus of any of aspects 1 to 21, further including that the memory and the at least one processor are further configured to: receive a configuration indicating a time-domain DMRS pattern, wherein the configuration includes one or more of: an indicator of a quantity of DMRS-containing symbols, an indicator of a DMRS starting location for each DMRS-containing symbol, and an indicator of a DMRS duration for each DMRS-containing symbol.

Aspect 23 is the apparatus of any of aspects 1 to 22, further including that the memory and the at least one processor are further configured to: receive the configuration via RRC signaling, a MAC-CE, or control information.

Aspect 24 is the apparatus of any of aspects 1 to 23, further including that the memory and the at least one processor are further configured to: receive a mapping between time-domain DMRS patterns and characteristics associated with single carrier waveforms.

Aspect 25 is the apparatus of any of aspects 1 to 24, further including that the characteristics include one or more of: a downlink data duration, an uplink data duration, and a rank.

Aspect 26 is the apparatus of any of aspects 1 to 25, further including that the memory and the at least one processor are further configured to: detect a characteristic of the single carrier waveform; and use the characteristic and the mapping to determine a time-domain DMRS pattern to apply to the single carrier waveform.

Aspect 27 is the apparatus of any of aspects 1 to 26, further including that the memory and the at least one processor are further configured to: receive, via RRC signaling, one or more time-domain DMRS patterns; and receive control information with the single carrier waveform indicating a first time-domain DMRS pattern of the one or more time-domain DMRS patterns.

Aspect 28 is the apparatus of any of aspects 1 to 27, further including that the memory and the at least one processor are further configured to: receive, via RRC signaling, one or more time-domain DMRS patterns; receive a MAC-CE to activate a subset of time-domain DMRS patterns of the one or more time-domain DMRS patterns; and receive control information indicating a first time-domain DMRS pattern of the subset of the time-domain DMRS patterns.

Aspect 29 is the apparatus of any of aspects 1 to 28, further including that a transceiver coupled to the at least one processor.

Aspect 30 is a method of wireless communication for implementing any of aspects 1 to 29.

Aspect 31 is an apparatus for wireless communication including means for implementing any of aspects 1 to 29.

Aspect 32 is a non-transitory computer-readable storage medium storing computer executable code, where the code, when executed, causes a processor to implement any of aspects 1 to 29.

Aspect 33 is an apparatus for wireless communication including at least one processor coupled to a memory and configured to transmit a first symbol in a single carrier waveform, the first symbol including a first set of DMRS resources; and transmit a second symbol in the single carrier waveform, the second symbol including a second set of DMRS resources, the second set of DMRS resources associated with at least one of a DMRS starting location and a DMRS duration that is different than the first set of DMRS resources.

Aspect 34 is the apparatus of aspect 33, further including that the first set of DMRS resources and data within the first symbol are one of time-division multiplexed, code-division multiplexed, or space-division multiplexed.

Aspect 35 is the apparatus of any of aspects 33 and 34, further including that the first symbol includes at least a CP, the first set of DMRS resources, and data, and the first set of DMRS resources are located after the CP in a time-domain and before the data in the time-domain.

Aspect 36 is the apparatus of any of aspects 33 to 34, further including that the first symbol includes at least a CP, the first set of DMRS resources, and data, and the data is located after the CP in a time-domain and before the first set of DMRS resources in the time-domain.

Aspect 37 is the apparatus of any of aspects 33 to 36, further including that the first set of DMRS resources are associated with a first DMRS starting location and the second set of DMRS resources are associated with a second DMRS starting location that is different than the first DMRS starting location.

Aspect 38 is the apparatus of any of aspects 33 to 36, further including that the first set of DMRS resources and the second set of DMRS resources are associated with a same DMRS starting location, the first set of DMRS resources are associated with a first DMRS duration, and the second set of DMRS resources are associated with a second DMRS duration that is different than the first DMRS duration.

Aspect 39 is the apparatus of any of aspects 33 to 36, and 38, further including that the second DMRS duration occupies fewer time-domain resources than the first DMRS duration.

Aspect 40 is the apparatus of any of aspects 33 to 39, further including that the first symbol includes at least a CP, the first set of DMRS resources, data, and PTRS resources.

Aspect 41 is the apparatus of any of aspects 33 to 40, further including that the first set of DMRS resources are derived using a first sequence and the PTRS resources are derived using a second sequence that is different than the first sequence.

Aspect 42 is the apparatus of any of aspects 33 to 40, further including that the first set of DMRS resources are derived using a first sequence and the PTRS resources are derived using a second sequence that is a same sequence as the first sequence.

Aspect 43 is the apparatus of any of aspects 33 to 40, and 42, further including that DMRS samples at a subset of the first set of DMRS resources and PTRS samples of the PTRS resources are same samples.

Aspect 44 is the apparatus of any of aspects 33 to 43, further including that the first symbol and the second symbol are included in a same slot.

Aspect 45 is the apparatus of any of aspects 33 to 44, further including that the first symbol and the second symbol are included in different slots.

Aspect 46 is the apparatus of any of aspects 33 to 45, further including that the memory and the at least one processor are further configured to: transmit a configuration indicating a time-domain DMRS pattern, wherein the configuration includes one or more of: an indicator of a quantity of DMRS-containing symbols, an indicator of a DMRS starting location for each DMRS-containing symbol, and an indicator of a DMRS duration for each DMRS-containing symbol.

Aspect 47 is the apparatus of any of aspects 33 to 46, further including that the memory and the at least one processor are further configured to: transmit the configuration via RRC signaling, a MAC-CE, or control information.

Aspect 48 is the apparatus of any of aspects 33 to 47, further including that the memory and the at least one processor are further configured to: transmit a mapping between time-domain DMRS patterns and characteristics associated with single carrier waveforms.

Aspect 49 is the apparatus of any of aspects 33 to 48, further including that the characteristics include one or more of: a downlink data duration, an uplink data duration, and a rank.

Aspect 50 is the apparatus of any of aspects 33 to 49, further including that the memory and the at least one processor are further configured to: transmit, via RRC signaling, one or more time-domain DMRS patterns; and transmit control information with the single carrier waveform indicating a first time-domain DMRS pattern of the one or more time-domain DMRS patterns.

Aspect 51 is the apparatus of any of aspects 33 to 50, further including that the memory and the at least one processor are further configured to: transmit, via RRC signaling, one or more time-domain DMRS patterns; transmit a MAC-CE to activate a subset of time-domain DMRS patterns of the one or more time-domain DMRS patterns; and transmit control information indicating a first time-domain DMRS pattern of the subset of the time-domain DMRS patterns.

Aspect 52 is the apparatus of any of aspects 33 to 51, further including a transceiver coupled to the at least one processor.

Aspect 53 is a method of wireless communication for implementing any of aspects 33 to 52.

Aspect 54 is an apparatus for wireless communication including means for implementing any of aspects 33 to 52.

Aspect 55 is a non-transitory computer-readable storage medium storing computer executable code, where the code, when executed, causes a processor to implement any of aspects 33 to 52.

What is claimed is:

1. An apparatus for wireless communication, comprising:
   memory; and
   at least one processor coupled to the memory, the at least one processor configured to:
   receive a first symbol of a single carrier waveform, the first symbol including a first set of demodulation reference signal (DMRS) resources;
   receive a second symbol of the single carrier waveform, the second symbol including a second set of DMRS resources, the second set of DMRS resources associated with at least one of a DMRS starting location and a DMRS duration that is different than the first set of DMRS resources; and
   estimate a channel condition based on at least one of the first set of DMRS resources and the second set of DMRS resources.

2. The apparatus of claim 1, wherein the first set of DMRS resources are associated with a first DMRS starting location and the second set of DMRS resources are associated with a second DMRS starting location that is different than the first DMRS starting location.

3. The apparatus of claim 1, wherein the first set of DMRS resources and the second set of DMRS resources are associated with a same DMRS starting location, the first set of DMRS resources are associated with a first DMRS duration, and the second set of DMRS resources are associated with a second DMRS duration that is different than the first DMRS duration.

4. The apparatus of claim 1, wherein the first symbol includes at least a cyclic prefix (CP), the first set of DMRS resources, data, and PTRS resources, and wherein the at least one processor is further configured to:
   detect a collision between the first set of DMRS resources and the PTRS resources; and
   apply a prioritization to the first set of DMRS resources or the PTRS resources based on the collision.

5. The apparatus of claim 4, wherein the first set of DMRS resources are derived using a first sequence and the PTRS resources are derived using a second sequence that is different than the first sequence.

6. The apparatus of claim 5, wherein the first set of DMRS resources are prioritized, and to puncture the PTRS resources, the at least one processor is further configured to:
   discard the PTRS resources at overlapping time-domain resource elements.

7. The apparatus of claim 5, wherein the first set of DMRS resources are prioritized, and to puncture the PTRS resources, the at least one processor is further configured to:
   discard the PTRS resources at a group of PTRS resources that overlaps with the first set of DMRS resources, the PTRS resources being associated with a quantity of groups of PTRS resources and a group-size of the PTRS resources per symbol.

8. The apparatus of claim 5, wherein to apply the prioritization, the at least one processor is further configured to:
puncture the first set of DMRS resources.

9. The apparatus of claim 4, wherein the first set of DMRS resources are derived using a first sequence and the PTRS resources are derived using a second sequence that is a same sequence as the first sequence.

10. The apparatus of claim 1, the at least one processor is further configured to:
receive a configuration via at least one of radio resource control (RRC) signaling, a medium access control-control element (MAC-CE), or control information, the configuration indicating a time-domain DMRS pattern, wherein the configuration includes one or more of:
a first indicator of a quantity of DMRS-containing symbols,
a second indicator of the DMRS starting location for each DMRS-containing symbol, and
a third indicator of the DMRS duration for each DMRS-containing symbol.

11. The apparatus of claim 1, the at least one processor is further configured to:
receive a mapping between time-domain DMRS patterns and characteristics associated with single carrier waveforms;
detect a characteristic of the single carrier waveform; and
use the characteristic and the mapping to determine a time-domain DMRS pattern to apply to the single carrier waveform.

12. The apparatus of claim 1, further comprising a transceiver coupled to the at least one processor.

13. The apparatus of claim 1, wherein the at least one processor is, individually or in combination, configured to receive the first symbol of the single carrier waveform, and receive the second symbol of the single carrier waveform.

14. The apparatus of claim 1, wherein the at least one processor is, individually or in combination, configured to transmit the first symbol in the single carrier waveform, and transmit the second symbol in the single carrier waveform.

15. A method of wireless communication, comprising:
receiving a first symbol of a single carrier waveform, the first symbol including a first set of demodulation reference signal (DMRS) resources;
receiving a second symbol of the single carrier waveform, the second symbol including a second set of DMRS resources, the second set of DMRS resources associated with at least one of a DMRS starting location and a DMRS duration that is different than the first set of DMRS resources; and
estimating a channel condition based on at least one of the first set of DMRS resources and the second set of DMRS resources.

16. The method of claim 15, wherein the first set of DMRS resources are associated with a first DMRS starting location and the second set of DMRS resources are associated with a second DMRS starting location that is different than the first DMRS starting location.

17. The method of claim 15, wherein the first set of DMRS resources and the second set of DMRS resources are associated with a same DMRS starting location, the first set of DMRS resources are associated with a first DMRS duration, and the second set of DMRS resources are associated with a second DMRS duration that is different than the first DMRS duration.

18. The method of claim 15, wherein the first symbol includes at least a cyclic prefix (CP), the first set of DMRS resources, data, and PTRS resources, and the method further includes:
detecting a collision between the first set of DMRS resources and the PTRS resources; and
applying a prioritization to the first set of DMRS resources or the PTRS resources based on the collision.

19. The method of claim 15, further comprising:
receiving a configuration via at least one of radio resource control (RRC) signaling, a medium access control-control element (MAC-CE), or control information, the configuration indicating a time-domain DMRS pattern, wherein the configuration includes one or more of:
a first indicator of a quantity of DMRS-containing symbols,
a second indicator of the DMRS starting location for each DMRS-containing symbol, and
a third indicator of the DMRS duration for each DMRS-containing symbol.

20. An apparatus for wireless communication, comprising:
memory; and
at least one processor coupled to the memory, the at least one processor configured to:
transmit a first symbol in a single carrier waveform, the first symbol including a first set of demodulation reference signal (DMRS) resources;
identify, based on a channel condition, a second set of DMRS resources associated with at least one of a DMRS starting location and a DMRS duration that is different than the first set of DMRS resources; and
transmit a second symbol including the second set of DMRS resources in the single carrier waveform.

21. The apparatus of claim 20, wherein the first set of DMRS resources are associated with a first DMRS starting location and the second set of DMRS resources are associated with a second DMRS starting location that is different than the first DMRS starting location.

22. The apparatus of claim 20, wherein the first set of DMRS resources and the second set of DMRS resources are associated with a same DMRS starting location, the first set of DMRS resources are associated with a first DMRS duration, and the second set of DMRS resources are associated with a second DMRS duration that is different than the first DMRS duration.

23. The apparatus of claim 20, wherein the first symbol includes at least a cyclic prefix (CP), the first set of DMRS resources, data, and PTRS resources.

24. The apparatus of claim 23, wherein the first set of DMRS resources are derived using a first sequence and the PTRS resources are derived using a second sequence that is different than the first sequence.

25. The apparatus of claim 23, wherein the first set of DMRS resources are derived using a first sequence and the PTRS resources are derived using a second sequence that is a same sequence as the first sequence.

26. The apparatus of claim 20, wherein the at least one processor is further configured to:
transmit a configuration via at least one of radio resource control (RRC) signaling, a medium access control-control element (MAC-CE), or control information, the configuration indicating a time-domain DMRS pattern, wherein the configuration includes one or more of:
a first indicator of a quantity of DMRS-containing symbols, a second indicator of the DMRS starting location for each DMRS-containing symbol, and a third indicator of the DMRS duration for each DMRS-containing symbol.

27. The apparatus of claim 20, further comprising a transceiver coupled to the at least one processor.

28. A method of wireless communication, comprising:

transmitting a first symbol in a single carrier waveform, the first symbol including a first set of demodulation reference signal (DMRS) resources;

identifying, based on a channel condition, a second set of DMRS resources associated with at least one of a DMRS starting location and a DMRS duration that is different than the first set of DMRS resources; and transmitting a second symbol including the second set of DMRS resources in the single carrier waveform.

29. The method of claim 28, wherein the first set of DMRS resources are associated with a first DMRS starting location and the second set of DMRS resources are associated with a second DMRS starting location that is different than the first DMRS starting location.

30. The method of claim 28, wherein the first set of DMRS resources and the second set of DMRS resources are associated with a same DMRS starting location, the first set of DMRS resources are associated with a first DMRS duration, and the second set of DMRS resources are associated with a second DMRS duration that is different than the first DMRS duration.

31. The method of claim 28, wherein the first symbol includes at least a cyclic prefix (CP), the first set of DMRS resources, data, and phase-tracking reference signal (PTRS) resources.

32. The method of claim 28, further comprising:

transmitting a configuration via at least one radio resource control (RRC) signaling, a medium access control-control element (MAC-CE), or control information, the configuration indicating a time-domain DMRS pattern, wherein the configuration includes one or more of:

a first indicator of a quantity of DMRS-containing symbols, a second indicator of the DMRS starting location for each DMRS-containing symbol, and a third indicator of the DMRS duration for each DMRS-containing symbol.

* * * * *